United States Patent
Jastrzebski

(10) Patent No.: US 12,180,603 B2
(45) Date of Patent: **\*Dec. 31, 2024**

(54) PROCESS FOR PRODUCTION OF REFINED LITHIUM METAL

(71) Applicant: Li-Metal Corp., Markham (CA)

(72) Inventor: Maciej Jastrzebski, Markham (CA)

(73) Assignee: Arcadium Lithium Intermediate IRL Limited, Shannon (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,736

(22) Filed: Nov. 11, 2022

(65) Prior Publication Data

US 2023/0203689 A1    Jun. 29, 2023

Related U.S. Application Data

(63) Continuation of application No. PCT/CA2022/050095, filed on Jan. 21, 2022.
(Continued)

(51) Int. Cl.
| | | |
|---|---|---|
| *C25C 3/02* | (2006.01) | |
| *C25C 7/04* | (2006.01) | |
| *C25C 7/06* | (2006.01) | |

(52) U.S. Cl.
CPC .................. *C25C 3/02* (2013.01); *C25C 7/04* (2013.01); *C25C 7/06* (2013.01)

(58) Field of Classification Search
CPC ..................................................... C25C 3/02
(Continued)

(56) References Cited

U.S. PATENT DOCUMENTS

| | | |
|---|---|---|
| 1,501,756 A | 7/1924 | Cloyd |
| 2,924,558 A | 2/1960 | Gallinger |
| (Continued) | | |

FOREIGN PATENT DOCUMENTS

| | | |
|---|---|---|
| CA | 2242421 | 8/1997 |
| CA | 3010198 A | 7/2017 |
| (Continued) | | |

OTHER PUBLICATIONS

Sridharan et al, Thermal Properties of LiCl—KCl Molten Salt for Nuclear Waste Separation, OSTI.gov Technical Report, available online at https://www.osti.gov/biblio/1058922, Nov. 2012, pp. 1-111 (Year: 2012).*

(Continued)

*Primary Examiner* — Harry D Wilkins, III
(74) *Attorney, Agent, or Firm* — Williams Mullen; F. Michael Sajovec

(57) ABSTRACT

A process for producing refined lithium metal can include: a) processing a lithium chemical feedstock material using an electrowinning apparatus to produce a crude lithium metal having a first purity; b) combining the crude lithium metal with a carrier material to create a lithium-rich feed alloy; c) introducing the lithium-rich feed alloy as a feedstock material to an electrorefining apparatus and processing the lithium-rich feed alloy using the electrorefining apparatus to separate lithium metal from the carrier material thereby producing i) a refined lithium metal having a second purity that is greater than the first purity and ii) a lithium-depleted alloy that comprises the carrier material and less lithium metal than the lithium-rich feed alloy; and d) extracting the lithium-depleted alloy from the electrorefining apparatus and recycling at least a portion of the lithium-depleted alloy to provide at least a portion of the carrier material used in step b).

20 Claims, 10 Drawing Sheets

Related U.S. Application Data

(60) Provisional application No. 63/140,149, filed on Jan. 21, 2021, provisional application No. 63/140,127, filed on Jan. 21, 2021, provisional application No. 63/140,119, filed on Jan. 21, 2021.

(58) Field of Classification Search
USPC .......................................................... 205/407
See application file for complete search history.

(56) References Cited

U.S. PATENT DOCUMENTS

| | | | |
|---|---|---|---|
| 3,111,745 | A | 11/1963 | Carlisle |
| 3,408,282 | A | 10/1968 | Frank |
| 3,607,684 | A | 9/1971 | Kuhn |
| 3,962,064 | A * | 6/1976 | Brut ................ C25C 7/005 205/407 |
| 4,089,770 | A | 5/1978 | Lemke |
| 4,092,228 | A | 5/1978 | Ross |
| 4,107,743 | A | 8/1978 | Minck |
| 4,108,743 | A | 8/1978 | Minck |
| 4,156,635 | A * | 5/1979 | Cooper ............. C25C 3/02 205/407 |
| 4,186,049 | A | 1/1980 | Blum |
| 4,256,551 | A * | 3/1981 | Cliff ................ C25B 1/00 205/531 |
| 4,455,202 | A | 6/1984 | Sintim-Damoa et al. |
| 4,592,821 | A | 6/1986 | Keinborg |
| 4,617,098 | A | 10/1986 | Verdier |
| 4,740,279 | A * | 4/1988 | Muller ............. C25C 3/02 204/247 |
| 4,780,186 | A | 10/1988 | Christini et al. |
| 4,790,917 | A * | 12/1988 | Dewing ........... C25C 3/02 205/705 |
| 4,849,072 | A | 7/1989 | Bowman |
| 4,882,017 | A | 11/1989 | Weaver |
| 4,973,390 | A * | 11/1990 | Christini ........... C25C 7/005 204/279 |
| 4,988,417 | A | 1/1991 | Deyoung |
| 5,131,988 | A * | 7/1992 | Peterson .......... C01D 15/04 75/690 |
| 5,650,053 | A | 7/1997 | Gay |
| 5,951,843 | A | 9/1999 | Itoh |
| 6,063,247 | A | 5/2000 | Bergmann |
| 6,086,733 | A | 7/2000 | Carey |
| 6,368,486 | B1 * | 4/2002 | Thompson ....... C25C 7/02 205/406 |
| 6,368,487 | B1 | 4/2002 | Huber |
| 6,730,210 | B2 | 5/2004 | Thompson |
| 7,897,023 | B2 | 3/2011 | Bakhir |
| 8,715,482 | B2 | 5/2014 | Amendola et al. |
| 11,174,562 | B2 | 11/2021 | But |
| 2003/0094379 | A1 | 5/2003 | Jacobson |
| 2004/0111874 | A1 * | 6/2004 | Schierle-Arndt ....... C25C 3/02 252/62.2 |
| 2004/0194574 | A1 | 10/2004 | Cardarelli |
| 2005/0100793 | A1 | 5/2005 | Jonghe |
| 2006/0144701 | A1 | 7/2006 | Kelly |
| 2007/0246368 | A1 * | 10/2007 | Huber ............ C25C 7/04 205/59 |
| 2008/0054629 | A1 | 3/2008 | Sawanura |
| 2010/0084265 | A1 | 4/2010 | Lee |
| 2011/0135565 | A1 | 6/2011 | Bingham |
| 2012/0006690 | A1 * | 1/2012 | Amendola ....... C25C 7/08 205/407 |
| 2012/0241314 | A1 | 9/2012 | Madono |
| 2013/0001097 | A1 | 1/2013 | Nakamura |
| 2014/0131217 | A1 | 5/2014 | Buschmann |
| 2015/0014184 | A1 | 1/2015 | Swonger |
| 2015/0041311 | A1 | 2/2015 | Mathé |
| 2015/0064568 | A1 | 3/2015 | Yushin |
| 2015/0129432 | A1 | 5/2015 | Wright |
| 2015/0211135 | A1 | 7/2015 | Fan |
| 2016/0251764 | A1 | 9/2016 | Iltsenko |
| 2018/0187317 | A1 | 7/2018 | Gordon |
| 2019/0048483 | A1 * | 2/2019 | Swonger ............ C25C 1/02 |
| 2020/0181783 | A1 | 6/2020 | But |
| 2020/0399772 | A1 | 12/2020 | Kiggins et al. |
| 2022/0267918 | A1 | 8/2022 | Jastrzebski |
| 2023/0119799 | A1 | 4/2023 | Jastrzebski |
| 2023/0167565 | A1 | 6/2023 | Jastrzebski |
| 2023/0183875 | A1 | 6/2023 | Jastrzebski |
| 2023/0349061 | A1 | 11/2023 | Jastrzebski |

FOREIGN PATENT DOCUMENTS

| | | |
|---|---|---|
| CN | 10135668 | 1/2009 |
| GB | 1024689 | 3/1966 |
| RU | 2008105197 | 8/2009 |
| WO | 1993010281 | 5/1993 |
| WO | 2014152393 A1 | 9/2014 |
| WO | 2019219821 | 11/2019 |
| WO | 2021012055 | 1/2021 |

OTHER PUBLICATIONS

Sekiguchi et al, Thermodynamic analysis of molten alkali halide mixtures by molecular dynamic simulations, Journal of Molecular Liquids, vol. 315, Oct. 2020, 113758 pp. 1-7 (Year: 2020).*

The International Search Report and Written Opinion dated Apr. 14, 2022 for PCT/CA2022/050095.

The International Search Report and Written Opinion dated May 3, 2022 for PCT/CA2022/050092.

The International Search Report and Written Opinion dated Apr. 21, 2022 for PCT/CA2022/050093.

Office action issued by CIPO on Dec. 11, 2023 in relation to CA 3,183,962.

European Search Report issued Jan. 4, 2024 in respect of EP 40004260.

Xin Zhang, Aiguo Han and Yongan Yang, "Review on the production of high-purity lithium metal", J. Mater. Chem. A, 2020,8, 22455-22466.

William H. Kruesi et al., "The Electrowinning of Lithium from Chloride-Carbonate Melts", Metallurgical Transaction B, vol. 24B, Aug. 1993-605.

Lukasko J.J and Murphy J.E., "Electrolytic Production of Calcium Metal", Report of Investigations/ 1990.

Office action issued on CA 3,183,962 on Jan. 25, 2023.

Office action issued onCA 3,183,962 on Dec. 11, 2023.

International search report and written opinion for International application No. PCt/CA2020/051021 mailed Oct. 5, 2020.

Office action issued in CN202080053142 on Apr. 7, 2024.

European Search Report issued Jan. 4, 2024 in relation to EP 20844442.2.

International search report for PCT/CA2020/051021 dated Sep. 8, 2020.

European Search Report issued for EP 20844442.2, mailed Dec. 8, 2023.

* cited by examiner

PROCESS FOR PRODUCTION OF REFINED LITHIUM METAL

CROSS-REFERENCE TO RELATED APPLICATIONS

This application is a continuation of international patent application no. PCT/CA2022/050095, filed Jan. 21, 2022 and entitled PROCESS FOR PRODUCTION REFINED LITHIUM METAL, which itself claims the benefit of and priority to i) U.S. provisional application No. 63/140,127 filed Jan. 21, 2021 and entitled Electrorefining Cell for Lithium Metal, ii) U.S. provisional application No. 63/140,119 filed Jan. 21, 2021 and entitled Process for Production Refined Lithium Metal and iii) U.S. provisional application No. 63/140,149 filed Jan. 21, 2021 and entitled Electrowinning Cell for the Production of Lithium and Method of Using Same, the entirety of these applications being incorporated herein by reference.

FIELD OF THE INVENTION

In one of its aspects, the present invention relates to refining lithium metal from a lithium-rich alloy, and in particular an electrorefining cell that can be used for refining lithium metal.

INTRODUCTION

International patent publication no. WO2019/219821 discloses a process for copper production comprising the electrorefining of copper in an electrolytic cell, wherein the voltage difference over the cell is maintained at less than 1.6 volt, the anode comprises at most 98.0% wt of copper and less than 1.00% wt of iron, the current density through the cell is at least 180 A/m$^2$ of cathode surface, electrolyte is removed from the cell during the operation at an average refreshing rate of 30-1900% per hour, by overflow of a first stream of electrolyte over a cell wall, and a gas is introduced into the cell and bubbled through the electrolyte in between anode and cathode. Further disclosed is a liquid molten metal composition suitable for copper anode electrorefining comprising at least 90.10% wt and at most 97% wt of copper, at least 0.1% wt of nickel, at least 0.0001% wt and less than 1.00% wt of iron, and 250-3000 ppm wt of oxygen.

U.S. Pat. No. 5,650,053 discloses a cathode-anode arrangement for use in an electrolytic cell is adapted for electrochemically refining spent nuclear fuel from a nuclear reactor and recovering purified uranium for further treatment and possible recycling as a fresh blanket or core fuel in a nuclear reactor. The arrangement includes a plurality of inner anodic dissolution baskets that are each attached to a respective support rod, are submerged in a molten lithium halide salt, and are rotationally displaced. An inner hollow cylindrical-shaped cathode is concentrically disposed about the inner anodic dissolution baskets. Concentrically disposed about the inner cathode in a spaced manner are a plurality of outer anodic dissolution baskets, while an outer hollow cylindrical-shaped is disposed about the outer anodic dissolution baskets. Uranium is transported from the anode baskets and deposited in a uniform cylindrical shape on the inner and outer cathode cylinders by rotating the anode baskets within the molten lithium halide salt. Scrapers located on each anode basket abrade and remove the spent fuel deposits on the surfaces of the inner and outer cathode cylinders, with the spent fuel falling to the bottom of the cell for removal. Cell resistance is reduced and uranium deposition rate enhanced by increasing the electrode area and reducing the anode-cathode spacing. Collection efficiency is enhanced by trapping and recovery of uranium dendrites scrapped off of the cylindrical cathodes which may be greater in number than two.

US patent publication no. US2010/0084265 discloses a continuous electrorefining device for recovering metal uranium. The electrorefining device comprises an electrolytic cell 10 having an internal accommodating space filled with electrolyte; a cathode unit 20 including a top plate 22, connecting rods 21 whose top ends are joined to the top plate 22, and cathode electrodes 24 whose top end is joined to lower plates; an anode unit 40 which is placed in a cylinder shape surrounding the cathode electrodes 24; a uranium recovery unit 50 for drawing out the uranium metal by a first drawing-out means; and a transition metal recovery unit 60 for drawing out the metal particles by a second drawing-out means. The cathode unit 20 further comprises an insulating and vibration absorbing member that is interposed between the top plate 22 and the cover plate 12; and a vibration means which is mounted on the top plate 22 to transmit vibration and impact force to the cathode electrode 24 through the connecting rods 21.

SUMMARY

Lithium metal can be produced using a variety of apparatuses and techniques, including molten salt electrolysis and electrolyzers can be used in the production of metals from chloride, oxide, nitrate, sulfate, hydroxides or carbonate compounds. One suitable molten salt electrolyzer apparatus and method is described international patent application no. PCT/CA2020/051021, which describes a containment vessel that is configured to contain a molten salt anolyte (and function as an anolyte chamber) and to have at least one electrode assembly and preferably having at least two electrode assemblies (each having an anode and a complimentary cathode) positioned within the containment vessel. Optionally, a single containment vessel (preferably with a single anolyte bath) may have 2 or more electrode assemblies (electrode pairs), and may have at least 3, 4, 5, 6, 7, 8, 9, 10, 11, 12, 13, 14, 15 or more electrode assemblies. In some preferred embodiments the containment vessel may include at least 10 electrode assemblies.

Lithium metal produced via molten salt electrolysis may have purities of approximately 95 and 99.8% (or higher or lower) depending on the particulars of the molten salt electrolysis, including its operating conditions, feedstock, post-processing processes and the like. To help improve the purity of the lithium metal it may be desirable to refine the lithium. This may be carried out by molten settling, filtration, distillation and vacuum distillation. Some drawbacks of these processes can include low efficiency and efficacy, for example, producing product which remain contaminated by some undesirable species, and low recovery, producing a significant volume of waste material highly contaminated by impurities, as a by-product of the refining process.

To help improve the purity of the lithium metal it may be desirable to refine the crude lithium metal. Some conventional processes for refining the crude lithium metal have included by molten settling, filtration, distillation and vacuum distillation. Some drawbacks of these processes can include low efficiency and efficacy, for example, producing product which remain contaminated by some undesirable species, and low recovery, producing a significant volume of waste material highly contaminated by impurities, as a by-product of the refining process.

Accordingly, there remains a need for an improved process for refining crude lithium metal into a refined lithium metal material that has a higher purity than the incoming crude lithium metal. Described herein are examples of improved processes and apparatuses for electrorefining lithium metal. In some examples, the new electrorefining apparatus includes a three-layer electrorefining cell that is configured to refine relatively purer lithium metal from an incoming feedstock that includes a lithium-rich feedstock alloy contains a combination of the crude lithium metal and a suitable base or carrier material that used to help carry/transport the crude lithium during the process and can serve as at least a portion of the consumable anode material that is converted to the desired refined lithium metal during the electrorefining processes described herein. The carrier material in the alloy is formed from one or more suitable carrier metals, and resulting lithium-rich feedstock alloy can therefore include the crude lithium metal and 1, 2, 3, 4 or more carrier metals. Some examples of suitable carrier metals that can be used as the carrier material in the feedstock alloy can include lead, bismuth, zinc, mercury, tin, aluminum, magnesium, indium, thallium, or alloys of these metals and the like. The interior of the apparatus can be configured to contain three function layers, including i) a bottom allow layer including the lithium-rich feedstock alloy, ii) a molten salt electrolyte layer and iii) an upper refined metal layer.

While some lithium production apparatuses exist for making crude lithium metal, and some refining apparatus exist for refining crude lithium metal to produce refined, higher purity lithium metal, there remains a need for a system or process that can achieve these two different steps/processes in a co-ordinated manner, and preferably in an online or flow-through type process that can be generally continuous from the introduction of a lithium-containing feedstock into the lithium production apparatus to the extraction of the refined lithium metal from the refining apparatus.

It would also be preferable if the crude lithium metal could be provided to the refining apparatus as part of an alloy material that is less reactive or volatile than the pure refined lithium metal. This may help reduce the complexity of the material handling requirements for the crude lithium metal material, and may help reduce the likelihood that the crude lithium metal will oxidize or otherwise develop impurities after production. Preferably, the process can be configured so that the crude lithium metal is mixed with a suitable carrier material (such as lead, bismuth, zinc, mercury, tin, aluminum, magnesium, indium, thallium, and the like and alloys or mixtures of two or more such metals) to make a lithium-alloy material that can then be used as the input or feedstock material for the refining sub-process. The carrier material may be introduced during the lithium production process, and optionally within the production apparatus chambers so that the carrier material can react with lithium in real-time as it is produced to form a product alloy in situ within the reaction chamber of the production apparatus. This alloy may then be provided to the refining apparatus without requiring a separate alloying step.

Referring to one broad aspect of the teachings described herein, a process for producing refined lithium metal from a lithium chemical feedstock, can include the steps of: a) processing a lithium chemical feedstock material using an electrowinning apparatus to produce a crude lithium metal having a first purity; b) combining the crude lithium metal with a carrier material to create a lithium-rich feed alloy; c) introducing the lithium-rich feed alloy as a feedstock material to an electrorefining apparatus and processing the lithium-rich feed alloy using the electrorefining apparatus to separate lithium metal from the carrier material thereby producing i) a refined lithium metal having a second purity that is greater than the first purity and ii) a lithium-depleted alloy that comprises the carrier material and less lithium metal than the lithium-rich feed alloy; and d) extracting the lithium-depleted alloy from the electrorefining apparatus and recycling at least a portion of the lithium-depleted alloy to provide at least a portion of the carrier material used in step b).

Steps a) and b) may both occur within the electrowinning apparatus, and optionally steps a) and b) may occur concurrently.

The process may include introducing the carrier material into the electrowinning apparatus during step a), whereby the carrier material and the crude lithium metal react with each other and the lithium-rich feed alloy is produced in situ within the electrowinning apparatus.

The process may include introducing the carrier material into a catholyte chamber of the electrowinning apparatus and independently introducing a catholyte material into the catholyte chamber during step a).

The process may include mixing the carrier material with a catholyte material and then introducing a mixture containing of the carrier material and the catholyte material into a catholyte chamber of the electrowinning apparatus, whereby the crude lithium metal reacts with the carrier material within the catholyte chamber and the lithium-rich feed alloy is produced in situ within the catholyte chamber.

The lithium-rich feed alloy may be molten when extracted from the electrowinning apparatus and remains molten until it is introduced into the electrorefining apparatus in step c).

The lithium-rich feed alloy may be molten when extracted from the electrowinning apparatus and further comprising cooling the lithium-rich feed alloy into a solid form, then re-heating the lithium-rich feed alloy into molten form before introducing the lithium-rich feed alloy into the electrorefining apparatus in step c).

The lithium-rich feed alloy may be molten when extracted from the electrowinning apparatus and further comprising cooling the lithium-rich feed alloy into solid form to provide a lithium-rich anode, and then using the lithium-rich anode in the electrorefining apparatus in step c).

The carrier material may include at least one of bismuth, tin, aluminum, indium, thallium, copper, iron and alloys thereof.

The carrier material may include at least two of bismuth, indium and tin.

The carrier material may include bismuth, indium and tin.

The lithium-rich feed alloy may have a melting temperature that is between 200-800 deg. C.

The lithium-rich feed alloy may have a melting temperature which is less than 600 deg. C.

The electrowinning apparatus may be a flow-through electrowinning apparatus, and step a) may include conveying a molten, anolyte material and a metal chemical feedstock material along an anolyte flow path within an anolyte chamber containing an anode; conveying a molten, catholyte material along a catholyte flow path within a catholyte chamber that has a cathode and is separated from the anolyte chamber via a separator assembly that includes a porous membrane configured to permit metal cation migration between the anolyte chamber and the catholyte chamber; applying an electric potential between the anode and the cathode that is sufficient to electrolyze and separate metal ions from the metal chemical feedstock material in the anolyte chamber, thereby causing a flux of metal cations to migrate through the porous membrane from the anolyte chamber to the catholyte chamber and a metal product comprising at least the crude lithium metal to be formed in the catholyte chamber; and while applying the electric potential, extracting a feedstock-depleted anolyte material from the anolyte chamber via an anolyte outlet; extracting an outlet material comprising the catholyte material and the metal product from the catholyte chamber via a catholyte outlet.

The process may include introducing the carrier material into the catholyte chamber during step a), whereby the carrier material and the crude lithium metal react with each other and the lithium-rich feed alloy is produced in situ within the electrowinning apparatus and the metal product comprises the lithium-rich feed alloy.

The process may include processing the outlet material to separate the catholyte material from the lithium-rich feed alloy using a separator, before introducing the lithium-rich feed alloy into the electrorefining apparatus in step b).

Step b) may occur outside the electrowinning apparatus.

Steps a) and b) may occur sequentially.

The electrowinning apparatus may be a flow-through electrowinning apparatus, and step a) may include conveying a molten, anolyte material and a metal chemical feedstock material along an anolyte flow path within an anolyte chamber containing an anode; conveying a molten, catholyte material along a catholyte flow path within a catholyte chamber that has a cathode and is separated from the anolyte chamber via a separator assembly that includes a porous membrane configured to permit metal cation migration between the anolyte chamber and the catholyte chamber; applying an electric potential between the anode and the cathode that is sufficient to electrolyze and separate metal ions from the metal chemical feedstock material in the anolyte chamber, thereby causing a flux of metal cations to migrate through the porous membrane from the anolyte chamber to the catholyte chamber and a crude lithium metal to be formed in the catholyte chamber; and while applying the electric potential, extracting a feedstock-depleted anolyte material from the anolyte chamber via an anolyte outlet; extracting an outlet material comprising the catholyte material and the crude lithium from the catholyte chamber via a catholyte outlet.

The process may include processing the outlet material to separate the catholyte material from the crude lithium metal using a separator, before combining the crude lithium metal with the carrier material to form the lithium-rich feed alloy.

The process may include adding the carrier material to the outlet material outside of the electrowinning apparatus to produce the lithium-rich feed alloy within the outlet material and then processing the outlet material to separate the catholyte material from the lithium-rich feed alloy using a separator, before introducing the lithium-rich feed alloy into the electrorefining apparatus.

The lithium chemical feedstock may include at least one of lithium carbonate and lithium hydroxide.

The carrier material may include at least one of bismuth, tin, aluminium, indium, thallium, copper, iron and alloys thereof.

The carrier material may include at least two of bismuth, indium and tin.

The carrier material may include bismuth, indium and tin.

The concentration of bismuth within the carrier material is between 0 wt %-80 wt %, and optionally between 30 wt %-60 wt %.

The concentration of indium metal within the carrier material may be between 0 wt %-80 wt %, and optionally between 22 wt %-60 wt %.

The concentration of tin within the carrier material may be between 0 wt %-80 wt %, and optionally between 10 wt %-60 wt %.

The lithium-rich feed alloy may have a density that is greater than 1.6 g/cm3.

A concentration of the crude lithium metal in the lithium-rich feed alloy may be equal to or greater than 0.1 at % and is equal to or less than about 80 at %.

Step a) may include conveying the metal chemical feedstock material and the anolyte material into the anolyte chamber via an anolyte inlet.

The process may include providing an anolyte reservoir outside the anolyte chamber and further comprising conveying the anolyte material from the anolyte reservoir to the anolyte chamber via an anolyte supply conduit.

The process may include recycling at least a portion of the feedstock-depleted anolyte material extracted from the anolyte chamber back into the anolyte reservoir.

The process may include pressurizing the anolyte chamber to a first hydrostatic pressure and the catholyte chamber to a second hydrostatic pressure that is greater than the first pressure, thereby facilitating a flux of catholyte material through the membrane from the catholyte chamber to the anolyte chamber.

The electrorefining apparatus may include a three-layer electrorefining apparatus having a housing defining an interior chamber, and wherein step c) may include a) providing a anode layer comprising the lithium-rich feed alloy; b) providing an electrolyte layer comprising a molten salt electrolyte material above the anode layer and within the interior chamber; c) providing a product layer comprising the refined lithium metal having the second purity above the electrolyte layer within the interior chamber; and d) applying an electric potential that is sufficient to electrolyze the lithium-rich feed alloy between the anode layer comprising the lithium-rich feed alloy and the product layer that is electrically isolated from the anode layer, whereby lithium metal is separated from the lithium-rich alloy, migrates through the electrolyte layer and collects in the product layer.

The process may include removing the refined lithium metal from the product layer while the apparatus is in use via a refined metal extraction apparatus in fluid communication with the upper layer.

The process may include concurrently with applying the electric potential in step d), introducing a flow of the lithium-rich feed alloy into the interior chamber via a feedstock inlet in communication with the anode layer, conveying the lithium-rich feed alloy through the interior chamber in a first flow direction while lithium metal is separated from the lithium-rich feed alloy and extracting a flow of the lithium-depleted alloy from the interior chamber via a feedstock outlet.

The process may include, concurrently with applying the electric potential in step d), introducing a flow the electrolyte material into the interior chamber via a electrolyte inlet in communication with the electrolyte layer, conveying the electrolyte material through the interior chamber in the first flow direction and extracting a flow of the electrolyte material from the interior chamber via an electrolyte outlet.

The process may include inhibiting mixing between the feedstock layer and the electrolyte layer by conveying the lithium-rich alloy through the interior chamber as a substantially laminar flow and conveying the electrolyte material through the interior chamber as a substantially laminar flow.

A carrier material circulation circuit may be provided outside the housing and may fluidly connects the feedstock outlet of the electrorefining apparatus, and optionally connects to the electrowinning apparatus, and the process may include conveying the lithium-depleted alloy containing the carrier material from the feedstock outlet to where it can be used to provide the at least a portion of the carrier material used in step b) of claim 1 via the carrier material circulation circuit.

The process may include processing the lithium-depleted alloy using a treatment apparatus provided in the carrier material circulation circuit downstream from the electrorefining apparatus to remove impurities from the lithium-depleted alloy, whereby the lithium-depleted alloy used in step b) contains relatively fewer impurities than the lithium-depleted alloy exiting the feedstock outlet of the electrorefining apparatus.

The process may include storing at least some of the lithium-depleted alloy in a carrier material reservoir provided in the carrier material circulation circuit between the electrorefining apparatus and the electrowinning apparatus and wherein at least a portion of the carrier material used in step b) of claim 1 is supplied from the carrier material reservoir.

The carrier material reservoir may be fluidly connected to the electrowinning apparatus whereby the carrier material used in step b) is withdrawn from the carrier material reservoir and supplied to the electrowinning apparatus.

The process may include an electrolyte circulation circuit outside the housing and fluidly connecting the electrolyte outlet and the electrolyte inlet and including an electrolyte reservoir from which the electrolyte material is supplied to the electrolyte inlet.

The process may include recycling at least a portion of the electrolyte material extracted from the electrolyte outlet of the electrorefining apparatus to the electrolyte reservoir.

The molten salt electrolyte material used in the electrorefining apparatus may have a density that is less than the density of lithium-rich feed alloy and is greater than 0.6 g/cm3.

The process of any one of claims 36 to 47, wherein the first purity is equal to or greater than about 80 at %.

The first purity may be equal to or less than about 99.9 at %.

The electrolyte material may include at least one of chloride, fluoride, iodide, bromide, sulphate, nitrate and carbonate salts, and mixtures thereof.

The electrolyte material may include at least one of LiCl—KCl, LlI—KI and LiI—CsI.

The electrolyte material may include a mixture of LiCl—KCl, LlI—KI and LiI—CsI.

The electrolyte material may be a eutectic mixture of LiCl—KCl, LlI—KI and LiI—CsI, in which the concentrations are 46% LiCl-54% KCl (by weight), 58.5% LlI-41.5% KI (by weight) and 45.7% LiI-54.3% CsI (by weight).

The electric potential may be between about 0V and about 3.6V.

The electric potential may be between 0.6V and about 1.0V.

A a current density between the anode layer and the product layer may be is between about 0.001 or 100 A/cm$^2$, or between about 0.05 or 1.5 A/cm$^2$, or between about 0.15-0.75 A/cm$^2$ or may be equal to or greater than 0.25 A/cm2.

BRIEF DESCRIPTION OF THE DRAWINGS

Embodiments of the present disclosure will be described with reference to the accompanying drawings, wherein like reference numerals denote like parts, and in which.

DETAILED DESCRIPTION

Figure 1:
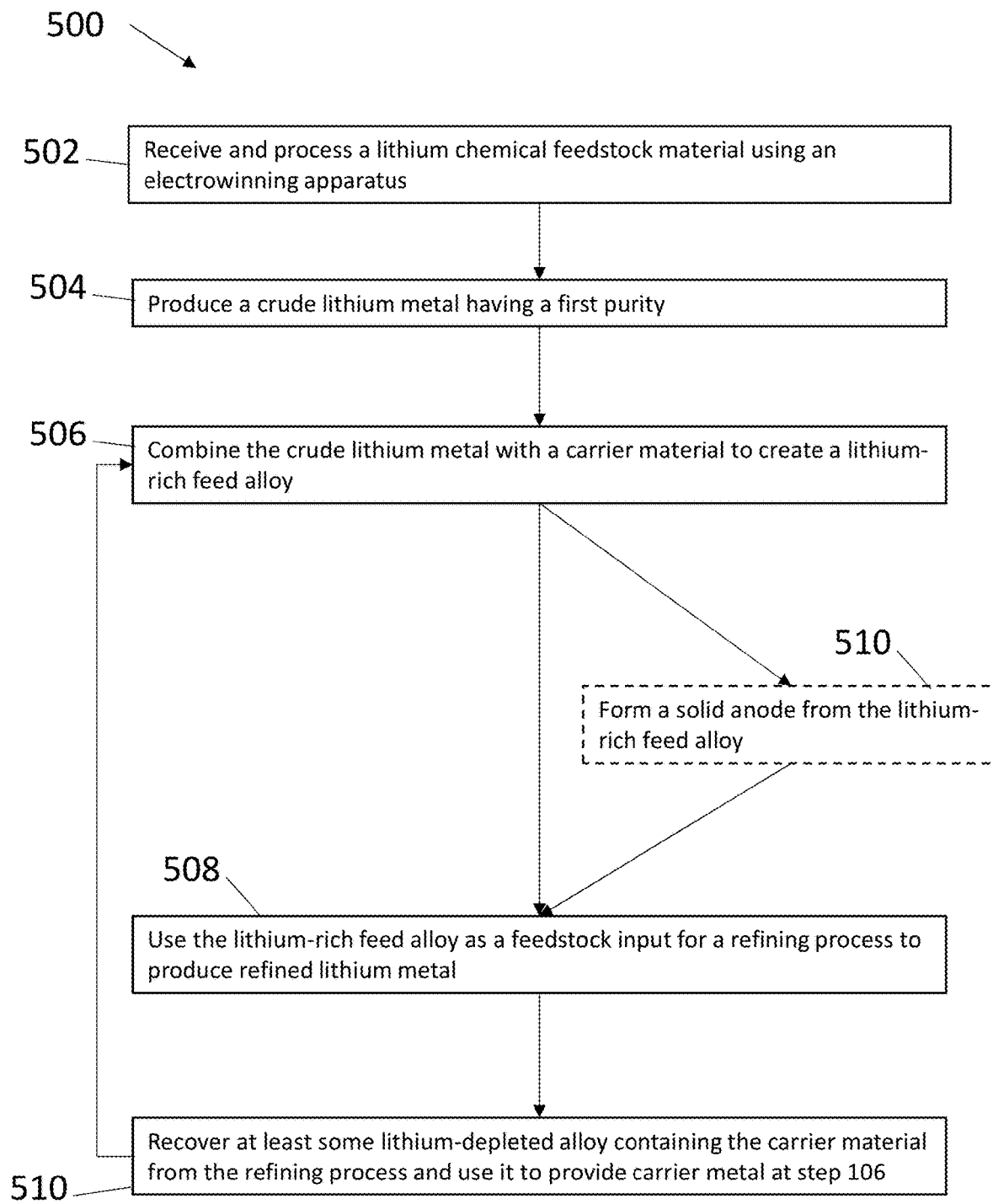
FIG. 1 is a flow chart showing one example of a method for producing a lithium-rich alloy and/or for producing refined lithium metal from a lithium chemical feedstock.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors, or owners do not intend to abandon, disclaim, or dedicate to the public any such invention by its disclosure in this document.

Some conventional processes for producing refined lithium metal include processes in which crude lithium metal is produced from a lithium chloride feedstock material and then use a distillation process for refining the crude metal. These processes may not be sufficiently robust, controllable or effective enough to allow production at scales needed to meet growing demand, as for example from secondary batteries using lithium metal anodes. In contrast, a novel process for producing and refining lithium metal is described herein.

In accordance with one broad aspect of the present teachings, a new process can include the steps of producing crude lithium metal from lithium chemical feedstock (such as $Li_2CO_3$) via a suitable lithium production system, such as via electrowinning process incorporating a LiCl—KCl or LiCl—KCl—$Li_2CO_3$ molten salt electrolyte material. The crude lithium metal can then be alloyed with a suitable carrier metal to produce a lithium-rich alloy. This may be done using a variety of different processes, including extracting the crude lithium metal from the lithium production system and combining the crude lithium metal with the desired carrier metal in a suitable vessel or using a suitable offline process. Alternatively, the carrier metal may be mixed with the crude lithium metal within the electrowinning process, for example if the carrier metal is used as a solvent cathode in the electrowinning process.

Some examples of suitable material, and in the examples described herein is a molten salt that is flowable through the apparatuses and processes described herein can include chloride, flouride, iodide, bromide, sulphate, nitrate and carbonate salts, and mixtures thereof and similar salts of other metals to produce a relatively low-melting point lithium ion containing melt, such as for example LiCl—KCl, LiI—CsI or LiI—KI. Optionally, the electrolyte material may include at least one of, or a mixture of LiCl—KCl, LiI—KI and LiI—CsI. In some examples, electrolyte material may be a eutectic mixture of LiCl—KCl, LiI—KI and LiI—CsI, in which the concentrations are between 46% LiCl—54% KCl (by weight), 58.5% LiI-41.5% KI (by weight) and 45.7% LiI-54.3% CsI (by weight). The electrolyte used in the systems described herein, and particularly in the electrorefining apparatus has a density that is less than the density of lithium-rich feed alloy and is greater than 0.6 g/cm$^3$, which may help ensure the refined lithium metal product will float above the electrolyte.

Some examples of suitable carrier metals that can be used in the lithium-rich alloy can include bismuth, tin, aluminum, indium, thallium, copper, iron and alloys magnesium and the like, or alloys of two or more of these elements. The resulting lithium-rich alloy is a composition that is suitable for further refining to isolate and purify the lithium carried therein. The lithium-rich alloy may be a PbLi alloy, an SnLi alloy, a BiLi alloy, an HgLi alloy, a SnLi alloy, an AlLi alloy, an MgLi alloy, other suitable alloys or combinations thereof. In some preferred examples, the carrier material comprises at least two of bismuth, indium and tin and optionally a combination of all three of bismuth, indium and tin. In these examples, the concentration of bismuth within the carrier material may be between 0 wt %-80 wt %, and optionally between 30 wt %-60 wt %; the concentration of indium metal within the carrier material may be between 0 wt %-80 wt %, and optionally between 22 wt %-60 wt %; and the concentration of tin within the carrier material may be between 0 wt %-80 wt %, and optionally between 10 wt %-60 wt %.

These lithium-rich alloys may have any suitable composition, and optionally may be between about 0.1% and about 80 at % lithium. Other compositions are also possible. Producing the lithium-rich alloy as an intermediary step between the crude lithium metal product and the lithium refining processes may allow flexibility in the timing and order of the refining process and other process steps. These compositions have been tested and found to provide a lithium-rich alloy having a relatively low melting point. Preferably, the lithium-rich alloy is created so that it has a melting temperature that is less than 600 degrees Celsius, and optionally can be less than 580, 560, 550, 525, 500, 480, 460, 450, 420 degrees Celsius. In some configurations, the melting temperature of the lithium-rich alloy is between 100-1000 degrees Celsius, or between 200-800 or 400-600 degrees Celsius, and may be between about 420-550 degrees Celsius. In some examples, the melting temperature can be less than 600 degrees Celsius. In these examples, the operating temperature of the cell 100 can be reduced to a level that is equal to, or preferably at least slightly greater than these melting temperatures, which may help reduce the energy consumption of the system.

The purity of the crude lithium metal that is produced in one stage of this system and that is alloyed to form the lithium alloy feedstock material can preferably be about 80-99.9 at %, but may be lower than 80 at % in some examples. In addition to the relative purity of the crude lithium metal itself, the lithium-alloy feedstock is also preferably prepared so that the concentration of lithium metal within the feedstock alloy may be between about 1 at % and about 80 at %, and preferably is less than about 80 at % because higher lithium content may alter some of the properties of the resulting lithium-rich alloy in undesirable ways. This is understood to be the concentration of lithium metal in the overall lithium-rich alloy, and does not include the contaminants or other non-lithium components of the incoming crude lithium metal material.

The lithium-rich alloy can then be refined using any suitable process, and preferably via an electrorefining process carried out using a suitable electrorefining system. Preferably, the lithium-rich alloy can be incorporated in the consumable anode of an electrorefining cell (either as a solid or as a liquid in an anode layer), such that when a suitable electric potential is applied lithium ions may be transferred from the lithium-rich alloy to a suitable cathode (preferably including substantially pure lithium metal). Depending on the configuration of the electrorefining cell, and other factors (such as its proximity to the lithium refining system). The refined lithium metal that is produced by refining can be at a second purity that is greater that the first purity of the crude lithium metal, and preferably can be greater than 80%, 85%, 90%, 95% 98%, 99%, 99.9%, 99.99% pure and may be about 99.995% or higher purity in some examples.

Optionally, the lithium-rich alloy can be cooled to solid form and stored as ingots (or any other suitable shape/form/object all of which can be referred to as ingots herein) for ease of transport and for future refining. For example, the lithium-rich alloy material may be generally less reactive than other forms of lithium and may be less prone to wear, oxidation or other types of degradation during the storage or transportation process, and may be generally less reactive and therefore safer to transport. The production of such lithium-rich alloys as the output of an electrowinning process may be desirable even if further refining is not part of the same process or may not occur until a later date (if ever). If further refining is desired, the ingots may be re-melted to provide a molten feed material that can function as a liquid anode in the electrorefining process, or optionally may be formed into solid anodes that may be used in the electrorefining process.

Alternatively, the lithium production system and the lithium refining system may be connected to each other such that the lithium-rich alloy exiting the lithium production system may be circulated to the lithium refining system without first cooling or casting into solid form. For example, both the lithium production system and the lithium refining system may be located within a common production facility and may be configured so that the lithium-rich alloy can flow to the lithium refining system for refining in an online or flow-through manner. Optionally, the systems can be calibrated so that the production rate of the lithium-rich alloy is less than or generally the same as the refining rate/capacity of the electrorefining system. Alternatively, the if the lithium-rich alloy production rate is greater than the capacity of the electrorefining system then some of the lithium-rich alloy may be held in a suitable storage tank/vessel under storage conditions that can keep it in its molten state, and can then be fed into the electrorefining system as capacity permits. Connecting the systems in this manner may help reduce the number of intervening handling or processing steps that are performed on the lithium-rich alloy.

Preferably, the lithium-rich alloy is configured so that its density is greater than the density of the electrolyte material that is used in the electrorefining process, as this may help reducing the mixing between a molten layer of the lithium-rich alloy and a molten layer of the electrolyte material if both materials are provided in molten form within the electrorefining cell. For example, the lithium-rich alloy may have a density that is greater than a density of the selected electrolyte material and that is greater than about 1.6 g/cm3.

Processes described herein may also be configured, such as by modifying the composition of the carrier materials, so that a vapour pressure of the lithium-rich alloy is at least 10 times lower than a vapour pressure of the refined lithium metal that is to be produced during the refining process.

Referring to FIG. 1, one example of a method 500 for processing a lithium chemical feedstock material using an electrowinning apparatus to produce a crude lithium metal having a first purity is illustrated. This process can include combining the crude lithium metal with a carrier material to create a lithium-rich feed alloy; introducing the lithium-rich feed alloy as a feedstock material to an electrorefining apparatus and processing the lithium-rich feed alloy using the electrorefining apparatus to separate lithium metal from the carrier material thereby producing a refined lithium metal having a second purity that is greater than the first purity and a lithium-depleted alloy that comprises the carrier material and less lithium metal than the lithium-rich feed alloy; and extracting the lithium-depleted alloy from the electrorefining apparatus and recycling at least a portion of the lithium-depleted alloy to provide at least a portion of the carrier material used in the earlier alloying step.

For example, the process 500 can include receiving an incoming supply of a suitable lithium chemical feedstock material at step 502. The lithium chemical feedstock material may preferably be lithium carbonate ($Li_2CO_3$) rather than LiCl, but various feedstock materials may be utilized in the given examples of the methods and systems described herein, including those described herein.

The lithium carbonate feedstock material can be processed using any suitable lithium production system, at step 504, to produce a crude lithium metal output product/stream having the first purity. One example of a suitable lithium production system is a molten salt electrolyzer apparatus and method as described in international patent application no. PCT/CA2020/051021, which is hereby incorporated by reference. Other electrowinning systems, including those described herein, may also be used.

At step 506, the crude lithium metal material is loaded into a suitable carrier material as described herein, to create a pregnant, lithium-rich alloy material. This can be done within the electrowinning apparatus itself if possible, or via an external alloying/mixing process. The lithium-rich alloy may be useful an intermediary or final product for a variety of purposes. The alloy may be used to fabricate products, cooled and cast for storage or shipping or for other purposes. In some examples of the processes described herein the method/process may conclude at step 506.

Optionally, the process 500 can continue with further steps and may be processed for producing and refining lithium metal. In some examples of such expanded processes, the process 500 can continue to step 508 in which the lithium-rich alloy material is then further processed using a suitable lithium refining system, possibly combining elements of distillation, filtration or settling, and preferably via an electrorefining process. In this step 508 the lithium-rich alloy may be fed into a suitable electrorefining system in a molten or liquid state and used as a liquid anode directly within the electrorefining cell. Alternatively, the process 500 may include an optional step 510 of cooling/casting the lithium-rich alloy into ingots or anodes prior to proceeding with the refining in step 508. Depending on the design of the refining system, lithium-rich alloy ingots could optionally be re-melted to be fed into an electrorefining system in a molten state, or could be added in solid/granular form. In other arrangements the electrorefining system may utilize solid anodes, rather than molten anodes, and suitable anodes that are made from the lithium-rich alloy (either entirely or in combination with other materials) and can then be used as sacrificial anodes within suitable electrorefining cells/systems.

While not illustrated with a separate process step in process 500, in some examples of the processes described herein the systems may also include one or more other processing, sub-processing and/or recycle or circulation processes or steps. At step 510, the method 500 includes recovering at least some of the lithium-depleted alloy that leaves the electrorefining apparatus and recycling the lithium-depleted alloy (which still contains useful carrier metals) upstream in the process as the incoming carrier metal that is used in alloying step 506.

Other options could be included, for example, the lithium production process may include electrolyte treatment, regeneration or recycling loops, material addition streams and loops, product or electrolyte circulation processes and the like. Similarly, the handling of the lithium-rich alloy material may include filtration, purification, casting, machining and packing operations, amongst other possible options, to help provide the lithium-rich alloy in its desired state—as and end product or input for the refining process. The refining system may also include suitable electrolyte treatment, regeneration or recycling loops, material addition streams and loops, alloy feed material circulation, extraction, circulation and re-conditioning processes, refined lithium metal product or electrolyte circulation and extraction processes and the like. The refined lithium metal that is obtained from the refining system, at step 508, can optionally be reintroduced into the refining system for further purification, sent for other further processing, solidified into ingots or other objects to be used as final products or as inputs to other manufacturing processes, used to help provide the cathode in the refining system/cell or used in other desirable ways.

Figure 2:
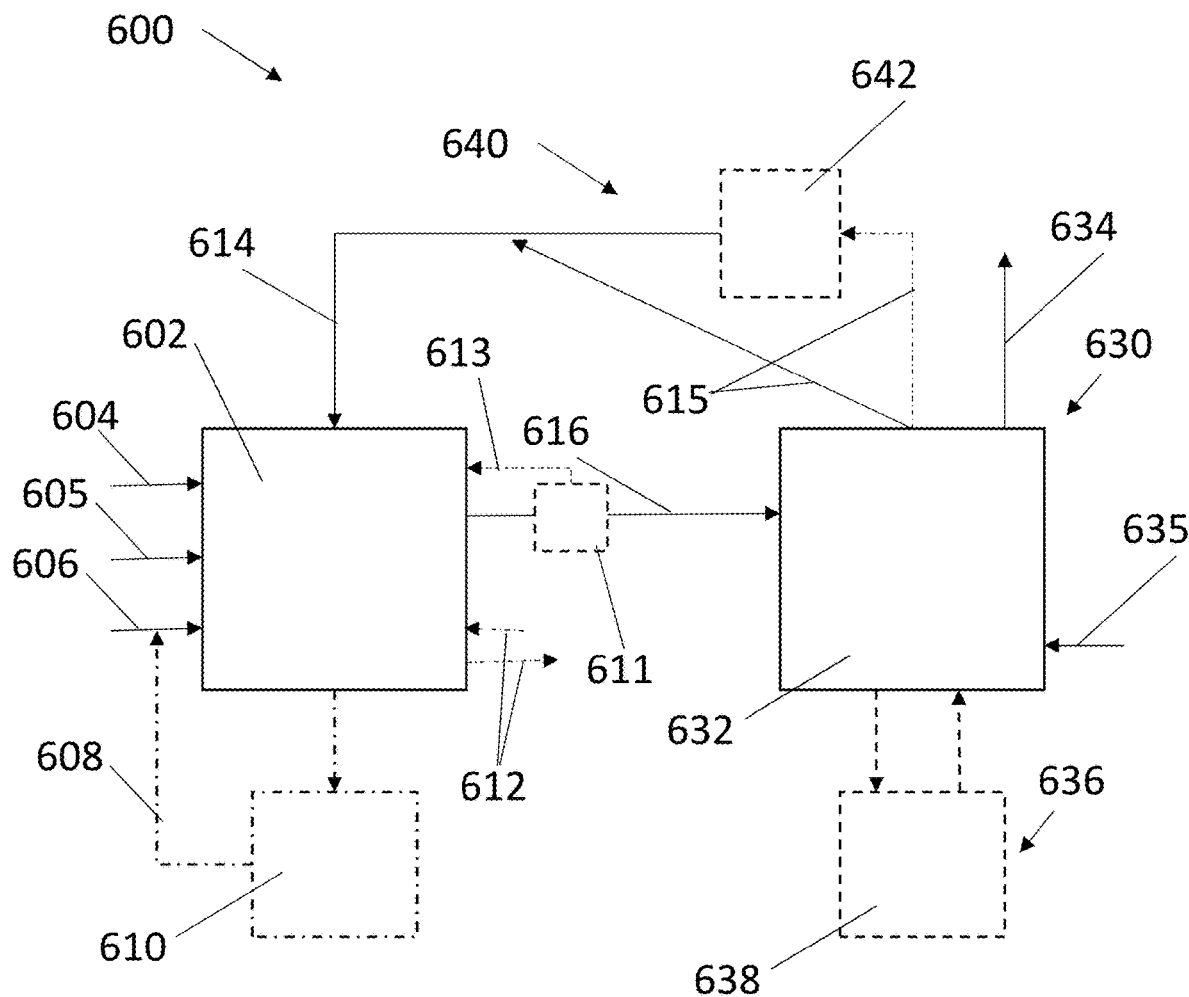
FIG. 2 is a schematic representation of a system for producing a lithium-rich alloy and/or for producing refined lithium metal from a lithium chemical feedstock.

Referring to FIG. 2, one example of a system 600 for producing a lithium-rich alloy and/or refined lithium metal includes a lithium production system 602, which in this example is an electrowinning apparatus. The lithium production system 602 is configured to receive a variety of suitable inputs, including the desired lithium chemical feedstock, containing $Li_2CO_3$, via feed stream 604, a supply of a molten salt catholyte material via stream 605, and a supply of molten salt anolyte material via stream 206. Optionally, the lithium chemical feedstock material may be pre-mixed with anolyte material before they enter the electrowinning cell, and inputs 604 and 606 may be combined as a single input/flow.

The system 600 may also include an optional anolyte recirculation loop 608, that may optionally include an anolyte reconditioning apparatus 610 that can perform suitable processes on the used anolyte stream exiting the electrowinning apparatus (such as ion exchange and drying processes) to recondition the anolyte material for further use and re-introduction into the electrowinning cell. Other optional circulation loops, output steams and the like (collectively shown using reference 612) may also be provided in the electrowinning apparatus.

In this example, the lithium production system 602 is configured so that the lithium-rich alloy is formed in situ within the electrowinning cell of the lithium production system 602, and accordingly includes a carrier material inlet stream 614 via which any suitable carrier metal, including those described herein, can be fed into the electrowinning apparatus 602 and can alloy in situ with the crude lithium metal produced within the electrowinning apparatus 602. Optionally, the carrier material may be pre-mixed with the catholyte material that is provided to the apparatus 602, and inputs 605 and 614 may be a common input that is drawing from a common source, such as a catholyte reservoir that holds a quantity of catholyte material mixed with the carrier material.

The lithium-rich alloy can then be withdrawn as a product stream from the lithium production system 602 via alloy stream 616 and in this example can be provided as an input to a suitable lithium refining system 630, that includes an electrorefining apparatus 632 in this example. In some embodiments, the alloy stream 616 may be a mixture of the lithium-rich alloy and another material, such as the catholyte material that was present in the catholyte chamber of the electrowinning apparatus 602. In such instances, it may be helpful for the material stream exiting the electrowinning apparatus 602 to be further processed so that the lithium-rich alloy can then be separated from the catholyte material using any suitable separator 611 (such as a weir or settling tank). Preferably, at least some of the catholyte material that is recovered from the outlet material stream by the separator 611 (i.e. that has been withdrawn from the catholyte chamber) can be recycled back into the electrowinning apparatus 602 or an associated catholyte reservoir via stream 613, and the lithium-rich alloy can continue to the electrowinning apparatus 632.

As the lithium-rich alloy is refined a product stream 634 containing the refined lithium metal can be withdrawn from the electrorefining apparatus 632. As the lithium metal is separated from the lithium-rich alloy, the remaining alloy will contain less lithium and when extracted from the electrorefining apparatus 632 can be referred to as a lithium-depleted alloy that contains less lithium than the lithium-rich alloy but still contains the carrier metals that formed part of the lithium-rich alloy.

The electrorefining apparatus 632 can be configured as a flow-through electrowinning cell and in this example includes an electrolyte inlet 635 for receiving the chosen molten salt electrolyte (which may be any suitable electrolyte, including those described herein) and optionally, the electrorefining apparatus 632 may also include an electrolyte circulation loop, shown using reference 636, for circulating the electrolyte through the apparatus 632. Preferably, the electrolyte circulation loop 636 can include a suitable reconditioning apparatus 638, for example, a selective precipitation or ion exchange circuit, for processing and optionally removing impurities from the electrolyte material, and at least some of the treated electrolyte can be recycled back into the electrorefining apparatus 632.

Optionally, system 600 may include an alloy circulation path 640 that forms part of a carrier material circulation circuit that can remove lithium-depleted alloy from within the electrorefining apparatus 632 for disposal or further processing via lithium-depleted alloy outlet stream(s) 615. In this arrangement the carrier material circulation circuit is provided outside of electrorefining apparatus 632 to the electrowinning apparatus 602 and fluidly connects the feedstock outlet of the electrorefining apparatus 632 to the electrowinning apparatus 602 (or other suitable location, directly or with intervening features or apparatuses) and can be used for conveying the lithium-depleted alloy containing the carrier material from the feedstock outlet to back to the electrowinning apparatus 602 where it can be used to provide the at least a portion of the carrier material that is added to the crude lithium metal created using the electrowinning apparatus. A variety of different apparatuses can be included in the carrier material circulation circuit, for example to help process or treat the lithium-depleted alloy before it reaches the electrowinning apparatus 602 (or other alloying location) so that it has more preferred characteristics.

Preferably, the further processing of the lithium-depleted alloy described herein can include one or more treatment and/or separating steps that can help recondition the lithium-depleted alloy so that it contains a suitable amount of the carrier metals that can be recycled to the electrowinning apparatus 602, but preferably has relatively fewer impurities (such as refining by-products, moisture, contaminants and the like) than the untreated lithium-depleted alloy that exits the electrorefining apparatus 632.

One example of an optional treatment apparatus 642 is illustrated in the embodiment of FIG. 2. The processing of the lithium-depleted alloy may be done while the alloy is in a molten state (as it leaves the electrorefining apparatus 632) or optionally may involve casting at least part of the lithium-depleted alloy into anodes and refining via known electrolytic or other hydrometallurgical techniques (before re-melting and optionally recycling at least some of the lithium-depleted alloy from the outlet streams 615 for provide at least part of the carrier material inlet stream 614 that can be re-introduced into the electrowinning apparatus 602 to be re-loaded with crude lithium metal. Such processing may advantageously remove the impurities accumulated in the lithium-depleted alloy in a form that is readily disposed of before re-introduction into the electrowinning apparatus 602, which may allow for re-use of the carrier metal. Optionally, all of the lithium-depleted alloy leaving the electrorefining apparatus 632 may be treated in this manner. Alternatively, only a portion of the lithium-depleted alloy leaving the electrorefining apparatus 632 may be treated using the apparatus 642, as shown via the two optional outlet streams 615 in FIG. 2.

In this example, the electrorefining apparatus 632 and the electrowinning apparatus 602 are generally directly, fluidly connected so that the lithium-rich alloy arriving at the electrorefining apparatus 602 in its molten state and is not cast into ingots or anodes before being introduced into the electrorefining apparatus 632, although any suitable flow control mechanisms, valves, pumps, holding tanks and the like can be provided between the apparatuses as needed—but are not illustrated in this schematic. While not shown for clarity, processing apparatuses can be provided in the lithium-rich alloy stream 616 between the electrowinning apparatus 602 and the electrorefining apparatus 632, to condition and/or pre-treat the lithium-rich alloy stream before refining.

Figure 3:
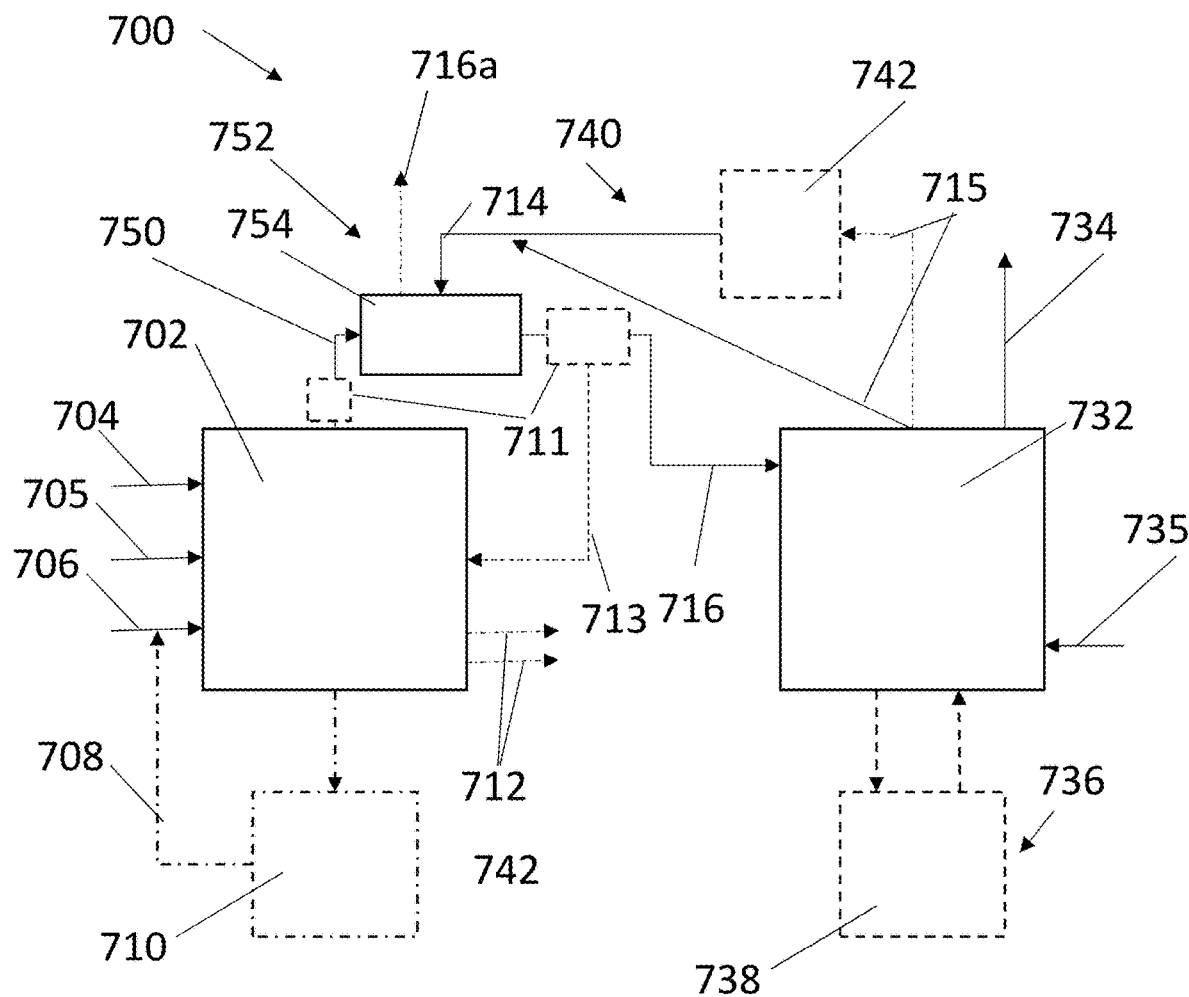
FIG. 3 is a schematic representation of another example of a system for producing a lithium-rich alloy and/or for producing refined lithium metal from a lithium chemical feedstock.

Referring to FIG. 3, a schematic representation of another example of a system 700 for producing lithium-rich alloy and/or refined lithium metal is illustrated. The system 700 is analogous to the system 600 with like features identified using like reference characters indexed by 100. The system 700 includes a lithium production system 702, which in this example is an also an electrowinning apparatus, having a $Li_2CO_3$ feed stream 704, a supply of a molten salt catholyte material via stream 705, and a supply of molten salt anolyte material via stream 706. Optionally, the lithium chemical feedstock material may be pre-mixed with anolyte material before they enter the electrowinning cell, and inputs 704 and 706 may be combined as a single input/flow.

The system 700 may also include an optional anolyte recirculation loop 708, that may optionally include an anolyte reconditioning apparatus 710 that can perform suitable processes on the used anolyte stream exiting the electrowinning apparatus (such as ion exchange and drying processes) to recondition the anolyte material for further use and re-introduction into the electrowinning cell. Other optional circulation loops, output steams and the like (collectively shown using reference 712) may also be provided in the electrowinning apparatus.

In this example, the lithium production system 700 is configured so that the lithium-rich alloy is formed outside the electrowinning apparatus 702, instead of being formed in situ. In this example, a stream 750 of crude lithium metal is extracted from the electrowinning apparatus 702 and directed to a separate alloying system 752 that can include a suitable reservoir or vessel/furnace 754 that receives the crude lithium metal stream 750 and the carrier metal inlet stream 714 via which the carrier metal (contained in the lithium-depleted alloy), which may be tin in this example, can be fed into the alloying system 752.

In some embodiments, the outlet stream 750 from the electrowinning apparatus 702 may be a mixture of the crude lithium metal and another material, such as the catholyte material that was present in the catholyte chamber of the electrowinning apparatus 702. In such instances, it may be helpful for the material stream exiting the electrowinning apparatus 702 to be further processed that so the crude lithium metal can then be separated from the catholyte material using any suitable separator 711 (such as a weir or settling tank). Preferably, at least some of the catholyte material that is recovered from the outlet material stream by the separator 711 (i.e. that has been withdrawn from the catholyte chamber) can be recycled back into the electrowinning apparatus 702 (or into the alloying system 752 or other location such as an associated catholyte reservoir) via stream 713, and the lithium-rich alloy can continue to the electrowinning apparatus 732. The separator 711 may be located upstream from the alloying system 752, such that the crude lithium metal is separated from the electrolyte before it is combined with the alloying carrier metals in the alloying system 752. Alternatively, the separator 711 may be located downstream from the alloying system 752, such that the carrier material is added to a stream that includes a combination of the crude lithium metal and the catholyte material. The resulting stream that now includes the catholyte material and the newly formed lithium-rich alloy can then be processed by the separator 711 to separate the catholyte material from newly formed lithium-rich alloy.

In this example, lithium-depleted alloy can be removed from the electrorefining apparats 732 via streams 715 for further process using a treatment apparatus 742 provided in the carrier material circulation circuit 740 between the electrorefining apparatus and the electrowinning apparatus before it is joined into inlet stream 714 to allow for the recycle/re-use of at least some of the lithium-depleted alloy to mix with the crude lithium in the reservoir 754 to provide lithium-rich alloy. The lithium-rich alloy optionally flows into the electrorefining apparatus 732 or can be can then be cooled and cast into solid form and then withdrawn from the alloying system 752. This can include providing at least some of the lithium-rich alloy as an input via an alloy stream 716 (which can refer to both molten alloy and the provision of lithium-rich alloy in a solid form as a feed material and/or anode component) input to a suitable lithium refining system, that includes an electrorefining apparatus 732 in this example. Optionally, a portion of the lithium-rich alloy can be extracted from the alloying system 752 as a finished product, via product stream 716a and can be provided to users or sent for other types of further processing as desired.

As the lithium-rich alloy is refined using the apparatus 732, a product stream 734 containing the refined lithium metal can be withdrawn from the electrorefining apparatus 732. The electrorefining apparatus 732 in this example also includes an electrolyte inlet 735 and an electrolyte circulation loop 736 (with optional reconditioning apparatus 738).

Optionally, the electrorefining apparatus 732 may include a feedstock alloy circulation loop 740, that is configured to recycle at least some of the depleted-lithium alloy stream 715 exiting the apparatus 732 to the alloying system 752 that is outside the electrowinning apparatus 702, and which receives the crude lithium metal 750 for alloying. The alloy circulation loop may include an optional, suitable alloy reprocessing unit 742 to process the alloy (in either solid or molten form). The reprocessed alloy (lithium depleted stream 714) may be mixed with the crude lithium in the alloying system 732 before entering the electrorefining unit 732 as part of the inlet stream 716. If the lithium-rich alloy is incorporated into a solid anode for the electrorefining apparatus 732 then inlet stream 716 may not be necessary.

The electrorefining apparatus 732 can be operated so that the electric potential is at between about 0V and about 3.6V, or between electric potential is between 0.6V and about 1.0V. The electrorefining apparatus can be operated so that a current density between the anode layer and the product layer is between about 0.001 or 100 $A/cm^2$. is between about 0.05 or 1.5 $A/cm^2$, and optionally is between about 0.15-0.75 $A/cm^2$, and optionally may be equal to or greater than 0.25 $A/cm^2$.

Figure 4:
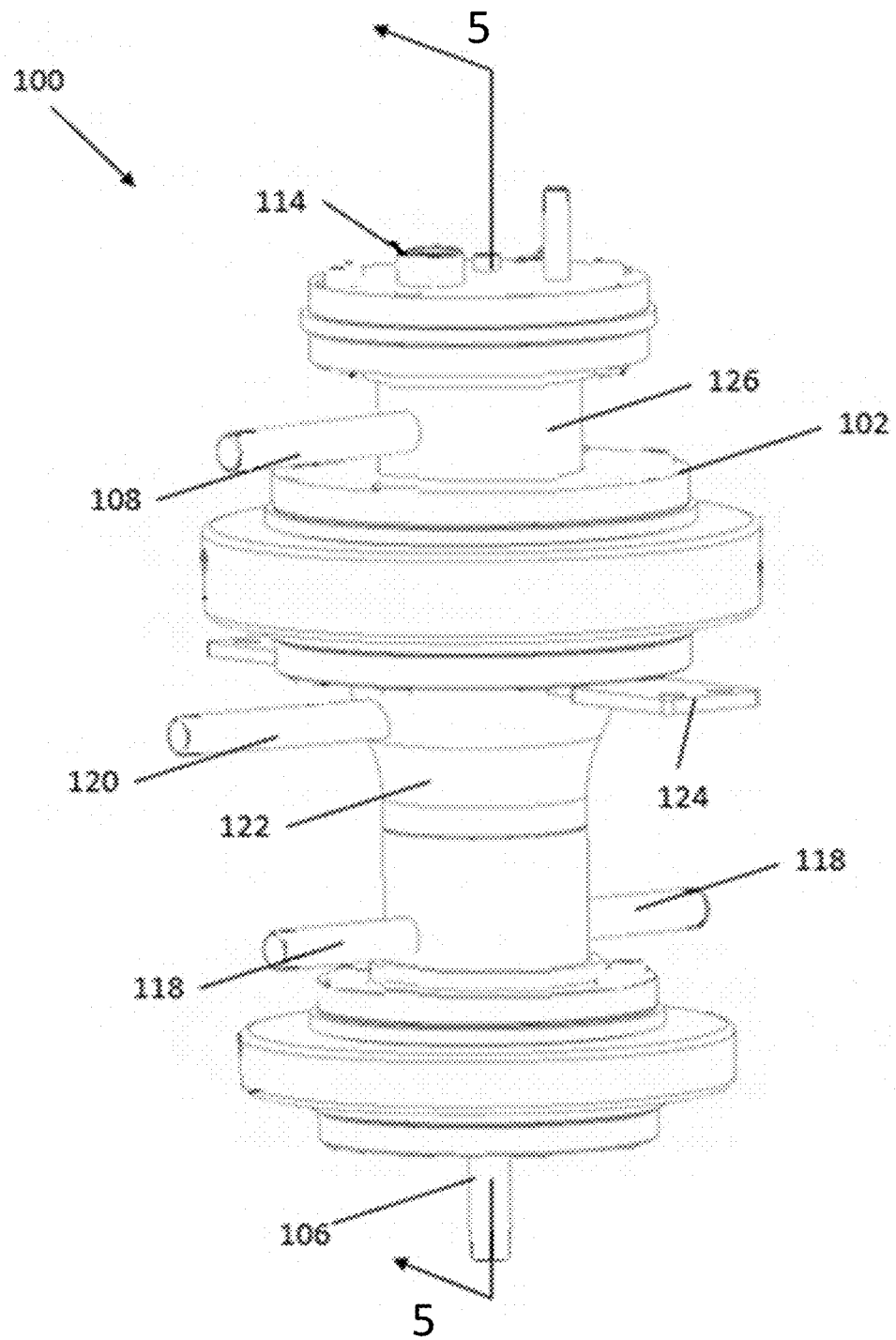
FIG. 4 is a perspective view of one example of a flow-through electrowinning cell.
Figure 5A:
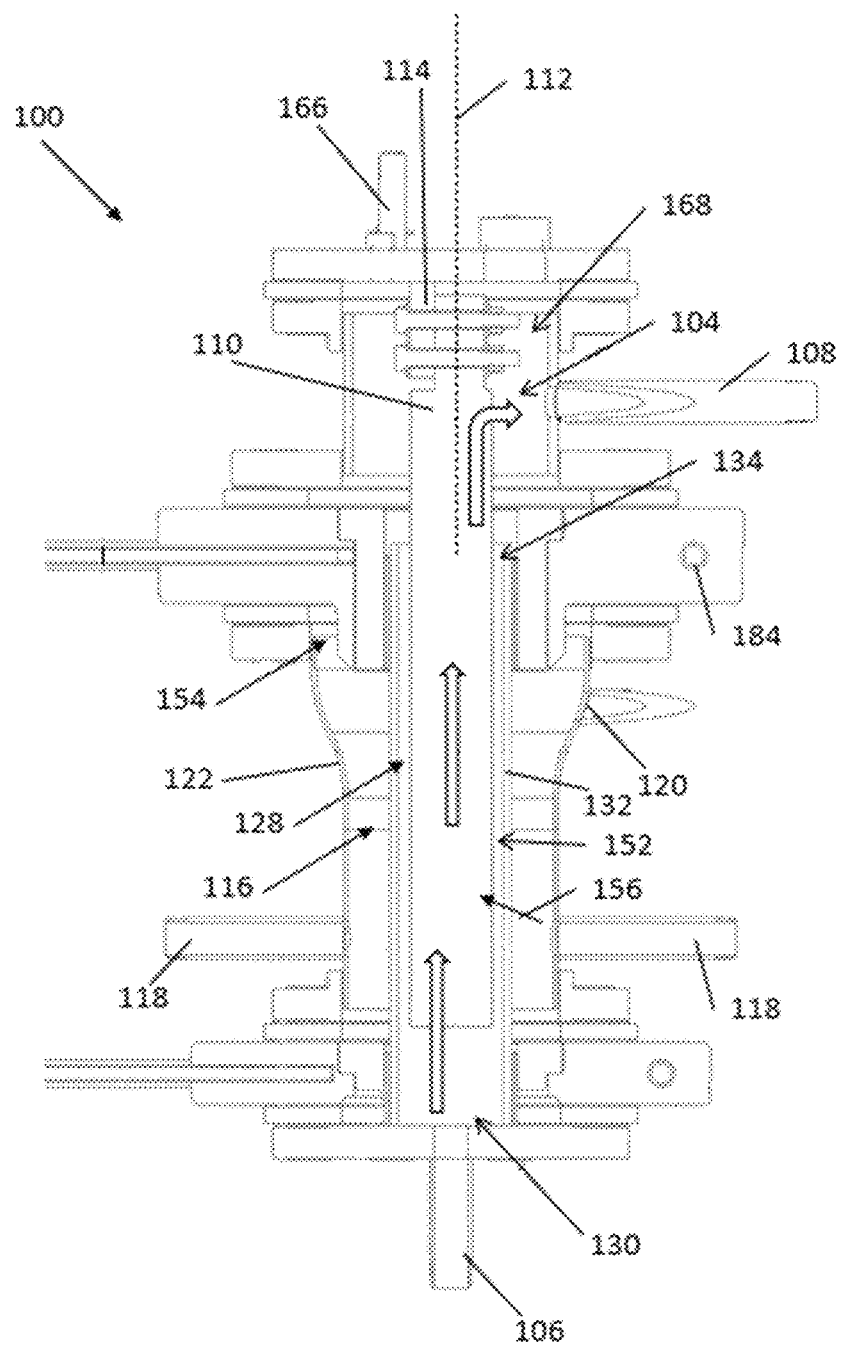
FIG. 5a is a side cross-sectional view of the electrowinning cell of FIG. 1, taken along line 5-5.
Figure 5B:
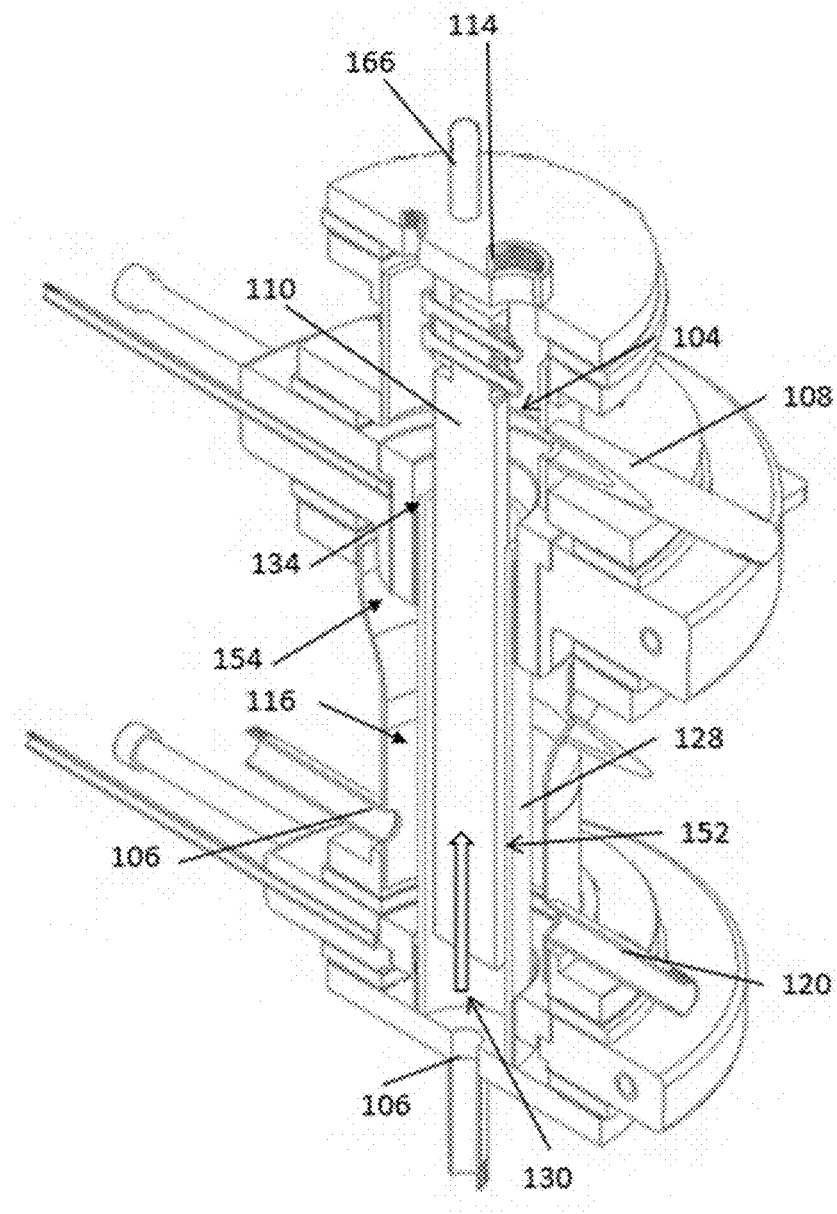
FIG. 5b is a perspective cross-sectional view of the electrowinning cell of FIG. 1, taken along line 5-5.
Figure 6:
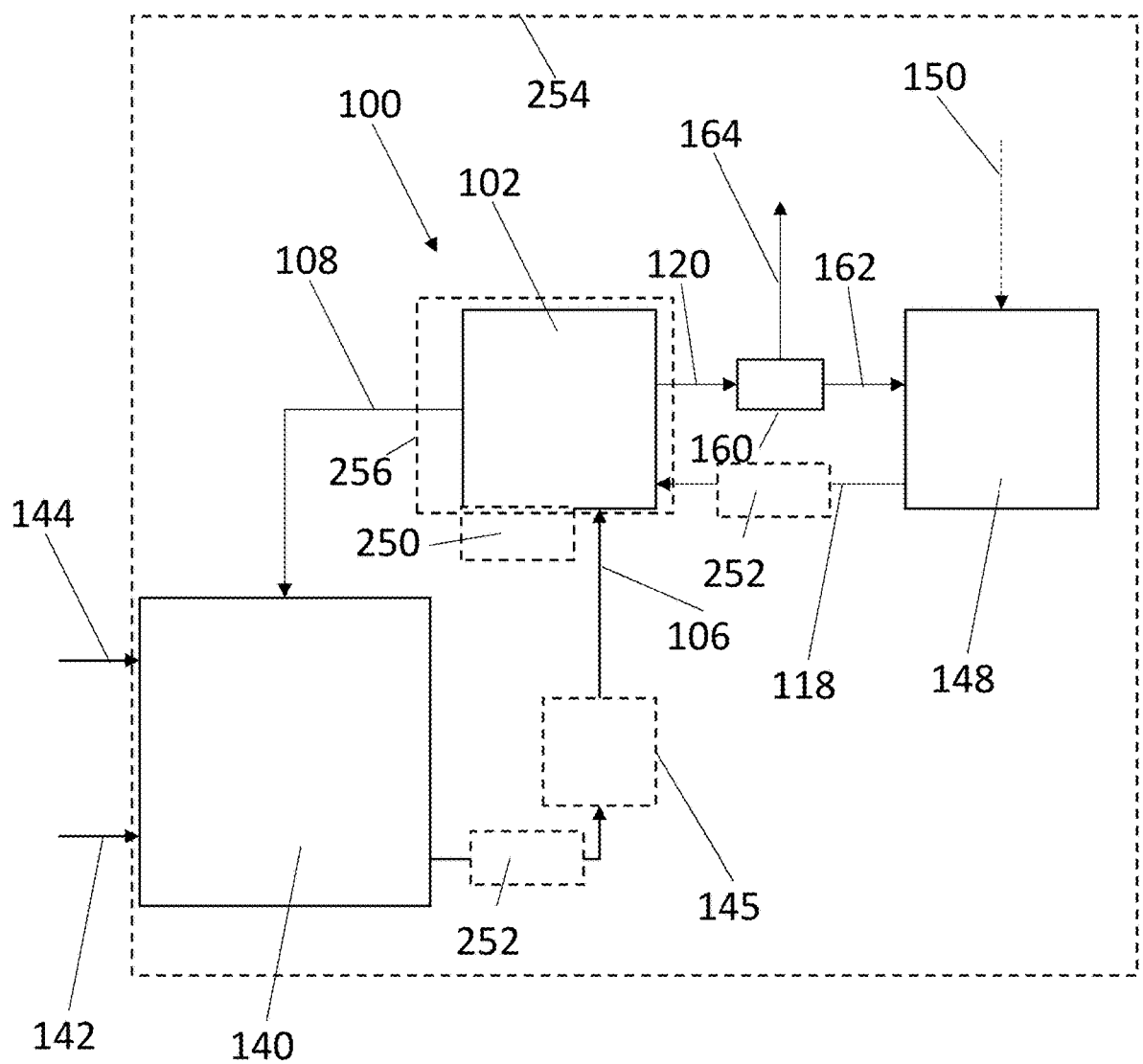
FIG. 6 is a schematic representation of a lithium production system including the electrowinning cell of FIG. 4.

Referring to FIGS. 4-6, a schematic representation of one example of an electrowinning apparatus that can be used in the systems and processes described herein is configured as a flow-through cell 100 and to produce lithium metal from a lithium chemical feedstock is illustrated. An analogous apparatus could be used to produce other target metal products from a suitable target metal feedstock as noted herein.

In this example the cell 100 includes a housing 102 defining a cell interior that includes an anolyte chamber 104 that is fluidly connected between an anolyte inlet 106 and an anolyte outlet 108. The anolyte chamber 104 has an upper portion that is above a catholyte chamber 116 bounded by a portion of the housing 102 (e.g. by an anolyte chamber sidewall) and a lower portion that is bounded by a membrane (as described herein) and that is laterally surrounded by the catholyte chamber and catholyte material when in use.

An anode, which in this example is an elongate, rod-like anode 110 extends axially within the anolyte chamber 104 in a direction that is generally aligned with the cell axis 112. An anode connection 114 is electrically connected to the anode 110 and is connectable to a suitable power source.

The interior of the housing 102 also includes a catholyte chamber 116 that is in fluid communication with an associated catholyte inlet 118 and catholyte outlet 120. In this example, the catholyte chamber 116 is at least partially bounded by a catholyte sidewall that is provided by an electrically conductive portion of the housing 102, which also functions as the cathode 122 in this arrangement. In this arrangement, the cathode 122 laterally surrounds the catholyte material, the membrane and the anode 110, and provides a relatively large electrode surface area, as compared to a separate cathode member that could be positioned within a cathode chamber with a non-conductive sidewall. This cathode 122 is connectable to the suitable power source via a cathode connection 124. As described in more detail herein, the catholyte sidewall section of the housing 102 that functions as the cathode 122 in this example is electrically isolated from an upper portion 126 of the housing 102 that can be described as an anolyte sidewall that at least partially bounds the anolyte chamber 104. This anolyte sidewall extends from a first end that is proximate the first or upper end of the catholyte sidewall (e.g. the wall forming the cathode 122) to an opposing second or upper end. In this example, the separator assembly is located between the upper end of the catholyte sidewall (and cathode 122) and the lower end of the anolyte sidewall 126 and is configured to separate the catholyte chamber 116 from the anolyte chamber 104 and electrically isolate the catholyte sidewall (and cathode 122) from the anolyte sidewall 126.

To help separate the interiors of the anolyte chamber 104 and the catholyte chamber 116 the cell includes an elongate, axially extending tube-like membrane 128. In this example, the membrane 128 is configured as a generally hollow, elongate tube-like membrane or membrane tube having a lower end 130 that is located toward a lower end of the housing 102 and is in fluid communication with the anolyte inlet 106, an axially extending sidewall 132 that surrounds the anode 110 and passes through the catholyte chamber 116, and an opposing upper end 134 that is outside the catholyte chamber 116 and in fluid communication with an upper portion of the anolyte chamber 104 (bounded by the sidewall 126 and being located generally above the catholyte chamber 116 in this example). While the membrane 128 is illustrated as generally cylindrical in this example, other examples of the apparatuses described herein may have elongate membranes that have a non-cylindrical shape. In this arrangement, the interior of the membrane 128 forms a lower part/portion of the anolyte chamber 104 and anolyte flow path through the cell 100, which can help maintain a desired level of fluidic separation between the anolyte material flowing through the interior of the membrane 128 and the catholyte material surrounding the outer surface of the membrane 128.

Referring also to FIG. 6, when the cell 100 is in use, the molten anolyte material, containing a relatively high concentration of the lithium chemical feedstock ($Li_2CO_3$ in this example) is drawn from a suitable anolyte material reservoir 140 and fed into the anolyte inlet 106. The anolyte reservoir 140 can have an anolyte inlet port 142 for receiving make-up anolyte material and a feedstock port 144 for receiving the lithium chemical feedstock. While shown schematically as separate ports, the ports 142 and 144 may be combined as a single port. The anolyte reservoir 140 may also include other suitable equipment, such as heaters, stirrers or agitators, pumps, flow control apparatuses and the like which have not been illustrated schematically. The anolyte flow path may include a heater or any such apparatus that can keep the anolyte material above its freezing temperature, and in its desire molten state, along the anolyte flow path while the cell 100 is in use. This can include heating the anolyte reservoir 140, the supply and removal conduits, the anolyte chamber 104 and other portions of the apparatus that accommodate a flow of anolyte material while the system is in use. The anolyte flow path may optionally also include a heat exchanger 145 or other equipment for heating, cooling and/or otherwise conditioning the anolyte material.

Optionally, to help maintain the feedstock and the electrolyte (e.g. catholyte and anolyte) materials at the desired operating temperature, the apparatuses described herein can include any suitable type of heater that can be used to help keep the interior chamber at an operating temperature that is higher than the a freezing temperature of the feedstock material, the molten salt electrolyte material and the lithium metal or other metal product.

Optionally, a suitable heater can include a heating element in contact with an outer surface of the housing, such as an optional contact heating element 250 that is schematically illustrated in FIG. 6. Alternatively, or in addition to a housing heater like 250, the system could include one or more inline heaters having heating elements that can heat the flows of the feedstock and electrolyte materials while they are outside of the interior chamber of the cell—such as the heaters 252 illustrated schematically in FIG. 6. Each of these heating elements, can include resistive heaters, heat exchanger coils and any other suitable heating mechanism. Heaters 250 and 252 could be used together in some systems, or as alternatives in other systems (i.e. a system need not include both heaters 250 and 252).

Alternatively, or in addition to the heaters 250 or 252, the heater used with the apparatus can be an external heating device that does not need to be in direct contact with the housing 102 or the flowing materials. One example of such a device is a furnace chamber or other environment that is sized to contain the entirety of the cell, and optionally the feedstock and/or electrolyte material reservoirs (such as anolyte reservoir 140 or catholyte reservoir 148) and at least portions of the supply and recycle conduits. The interior of the furnace chamber can be heated to a temperature that is equal to, or preferably is slightly greater than the desired operating temperature of the cell. This ambient, environmental heating can heat the cell and its contents without exposing the heating elements to direct contact with the electrolyte or lithium metal, which may help reduce damage to the heating elements. Examples of such surrounding, furnace chambers are shown schematically as chambers 254 that is large enough to contain the housing 102, reservoir 140 and reservoir 148, and alternative chamber 256 that is large enough to contain the housing 102, but not the reservoirs 140 and 148. The heaters and chamber 250, 252, 254 and 256 are shown in dashed lines to indicate they are optional features of these examples.

As the anolyte material flows along its anolyte flow path through the cell 100 (including at least a portion of the anolyte flow path that is provided by the interior of the anolyte chamber 104 including the interior of the membrane 128 as well as the anolyte inlet 106 and outlet 108), catholyte material is drawn from a suitable catholyte reservoir 148 and fed into the catholyte chamber 116 via the catholyte inlet 118. Optionally, as described herein, some examples of the apparatuses can be configured such that a carrier metal can also be provided within the catholyte chamber 116 while the apparatus is in use. Preferably, a carrier metal material be introduced into the catholyte flow path and can be mixed with the catholyte material before the material enters the catholyte chamber 116 (but alternatively may be introduced into the catholyte chamber without pre-mixing), for example if the cell 100 is to be configured to alloy the crude lithium metal with a carrier metal in situ within the catholyte chamber 116.

For example, the catholyte reservoir 148, or a suitable, separate combining apparatus separate from the catholyte reservoir, may include a carrier metal inlet port through which a suitable carrier metal can be fed into the catholyte material. The catholyte flow path may include a heater, heat exchanger or any such apparatus that can keep the catholyte material above its freezing temperature, and in its desire molten state, along the catholyte flow path while the cell 100 is in use. This can include heating the catholyte reservoir 148, the supply and removal conduits, the catholyte chamber 116 and other portions of the apparatus that accommodate a flow of catholyte material while the system is in use. The catholyte flow path may also include other suitable equipment, such as heaters, stirrers or agitators, pumps, flow control apparatuses and the like which have not been illustrated schematically.

In this example, a substantially annular portion of the anolyte chamber 104 that is disposed radially between the anode 110 and the cathode 122 can define an electrolysis region 152. In other configurations the electrolysis region may have a different shape.

When an electric potential that is sufficient to initiate electrolysis of the lithium carbonate feedstock material is applied between the anode 110 and cathode 122 the lithium carbonate feedstock material flowing generally axially through the electrolysis region 152 can be electrolyzed such that lithium cations migrate from the electrolysis region 152 and into the surrounding catholyte chamber 116 by passing through the sidewall 132 of the membrane 128. The lithium ions can collect adjacent the cathode 122 and crude lithium metal can be collected from the catholyte chamber 116. In the examples illustrated herein, the electric potential may be 2.127V or greater to account to account for potential losses due to the apparatus, electrolyte and anode-cathode distance. The current density for the process may be between 0.75 A/cm$^2$ and about 4 A/cm$^2$.

As the crude lithium metal (one example of a metal product) that accumulates within the catholyte chamber 116 during operation is generally less dense than the catholyte material itself, the lithium metal product may tend to float toward an upper end or collection region 154 in the catholyte chamber 116 and an outlet material stream that includes some catholyte material and the metal product (lithium metal) can be withdrawn from the catholyte chamber 116 via the catholyte outlet 120. The outlet material stream can be stored, or preferably further processed to so that the crude lithium metal can then be separated from the catholyte material using any suitable separator 160 (such as a weir). Preferably, at least some of the catholyte material that is recovered from the outlet material stream (i.e. that has been withdrawn from the catholyte chamber) can be recycled back into the catholyte reservoir 148 via stream 162, and the crude lithium metal can be collected in a product stream 164.

As the process continues, anolyte material that is now relatively low in lithium carbonate (as the feedstock material is consumed via the electrolysis process) can then exit the electrolysis region 152 and flow into the upper portion of the anolyte chamber 104 and then out via the anolyte outlet 108. Optionally, this feedstock-depleted anolyte material can be recycled into the anolyte reservoir 140 where new feedstock material can be introduced.

Preferably, the hydrostatic pressure in the interior of the catholyte chamber 116 can be maintained at a first, catholyte pressure while the cell 100 is in use, while the pressure in the anolyte flow path and chamber 104 is at a second, anolyte pressure that is optionally equal to or less than the catholyte pressure, and preferably is less than the catholyte pressure.

This pressure difference can be carried by the membrane sidewall 132 and results in a net, generally inward net pressure gradient in the example illustrated (illustrated using arrows 156). Under these conditions, if any of the catholyte and/or anolyte material is able to seep through the sidewall 132 there will be a inward flux of catholyte material through the sidewall 132, flowing exclusively from the catholyte chamber 116 into the electrolysis region 152 of the anolyte chamber 104. Also, it is believed that these pressure-based effects may be effective because the hydrostatic pressure gradient may be sufficient to overcome the relatively weaker osmatic or local flow pressure differences that may tend to urge the non-metal ions or other impurities toward the catholyte chamber 116. These pressure effects have been observed to have less impact on the migration of the target metal ions (e.g. lithium ions) than the non-metal ions (e.g. carbonate ions). This may be at least in part because the positively-charged metal ions are urged relatively strongly toward the cathode due to the electromagnetic fields, while the non-metal, negatively-charged ions are not urged toward the cathode chamber as strongly.

This inhibition on the migration of non-metal ions into the catholyte chamber and/or any net flux of catholyte material into the anolyte chamber may help flush dissolved oxides and carbonates through the membrane 128 and may help prevent oxides and other impurities from accumulating with the catholyte chamber 116. This may help reduce fouling of the membrane 128 and the catholyte chamber 116.

The pressure difference between the catholyte chamber 116 and anolyte chamber 104 may be selected to so as to be sufficient enough to help provide the desired flux of catholyte material while not damaging the membrane, causing an undesirably high outflow of catholyte material or otherwise interfering with the desired electrolysis reaction. In the illustrated example, the difference between the catholyte pressure and the anolyte pressure may be between about 1 and about 18 inches of water gauge, but may be more or less in other examples.

Preferably, a vent conduit 166 can be provided toward the upper end of the anolyte chamber 104 and can be in fluid communication with a head space 168 in the anolyte chamber 104. Anode gases that collect in the head space 168 can be withdrawn from the anolyte chamber 104 via the vent conduit and may be further processed or released. With the cell 100 being substantially sealed it may also be possible in some embodiments to use LiCl as the feedstock material, as anode gasses can be collected/sequestered within the head space 168 and can be withdrawn from the cell 100 for further treatment before being released to the atmosphere.

Preferably, the interior of the cell 100 is generally sealed and is isolated from the surrounding environment, and its sub-compartments are separated from each other. This can help prevent oxygen, moisture and other atmospheric contaminants from entering the cell 100. In addition, the upper end of the catholyte chamber 116 is preferably separated from the anolyte chamber 104. As the membrane 128 extends through the catholyte chamber 116 in the illustrated example, sealing the catholyte chamber 116 may include at least partial sealing around/against the membrane 128.

Figure 7:
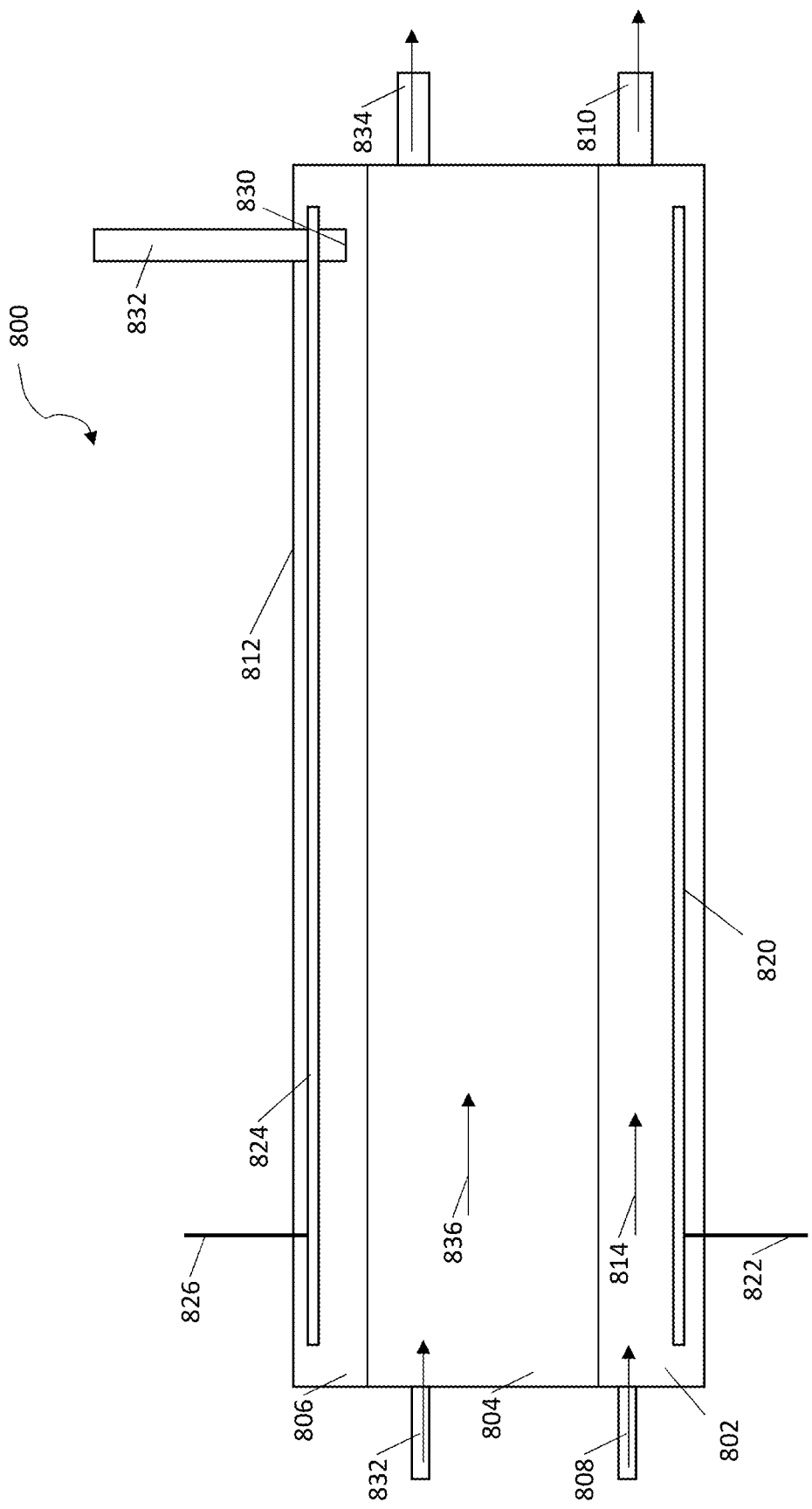
FIG. 7 is a schematic representation of one example of an electrorefining cell.

Referring to FIG. 7, a schematic representation of one example of an electrorefining cell 800 that is configured to refine relatively purer lithium metal from a lithium-rich alloy is illustrated. In this example the cell 800 includes housing 812 that defines an interior chamber that is configured to retain the materials described herein and can be formed in any suitable shape or configuration. In this example, the cell 800 can be described as a three-layer cell as it is configured to accommodate a lower, anode layer 802 that includes a liquid feedstock material (in the form of the lithium-rich alloy in this example), an intermediate, electrolyte layer 804 including a suitable liquid electrolyte material as described herein, and an upper, product layer 806 that contains a seed amount of the refined metal product when the cell 800 is started and in which, when an electric potential that is sufficient to electrolyze the lithium-rich alloy is applied within the cell 800 (as described herein), lithium metal that is liberated from the lithium-rich alloy can collect after it, migrates through the electrolyte layer 804.

In this schematic example, the cell 800 is configured as an elongate, conduit-like apparatus that is configured as a flow-through apparatus (i.e. the material in layers 802 and optionally 804 are flowing while the cell 800 is in use). In such arrangements, the cell 800 is preferably oriented generally sideways and arranged to be generally level, such that the free surfaces of the lower layer 802 and intermediate layer 804 are substantially flat and horizontal when the cell is in use 800 (as illustrated). This can help prevent unwanted flow characteristics, reaction properties and/or mixing between the layers.

To help facilitate the desired electrorefining process/reaction, the cell 800 includes at least one suitable anode conductor member 820 that is electrically connected to a suitable power source via connection 822, and a corresponding cathode conducting member as described below. The anode conductor member 820 is positioned to apply a charge to the lithium-rich alloy in the lower layer 802. The anode conductor member 820 may optionally, include an electrical conductor that is located within the interior chamber bounded by the housing 812 and is at least partially submerged in or otherwise in electrical contact with the lower layer 802 (such as conductor 820*a* in this schematic example). In other examples described herein, a sidewall or other suitable portion of the housing 812 itself that is in sufficient electrical contact with the lower, anode layer 802 may itself be electrically conductive and may be configured to function as a suitable anode. Optionally, if the feedstock material is electrically conductive it may act as the anode, and may be partially consumed, while the cell 800 is in use. The anode conductor member 820 (whether free standing or integrated into the housing sidewall) can be formed from any suitably electrically conductive material, and is preferably formed from the cathode is a material that is not wettable by, or is generally non-reactive with, the lithium metal, or may be made from stainless steel.

Similarly, the cell 800 includes at least one suitable cathode conducting member 824 that is located toward the top of the housing 812, connected to a suitable power source via connection 826 and can be in contact with the electrolyte and the refined lithium metal in the upper layer 806 when the cell 800 is in use. The cathode conducting member 824 is arranged as to be electrically isolated from the anode conductor member 820 and anode layer 802 and to apply its charge to an initial seed of the relatively purer lithium metal in the product layer 106, and to the rest of the lithium metal that accumulates in the product layer 806 while the cell 800 is in use, whereby the refined lithium in the product layer 806 (and the product layer 806 itself) functions as the cathode. In this arrangement, when the cell 800 is in use, and a suitable, electric potential is applied between the anode layer 802 and product layer 806 (e.g. an electric potential that is sufficient to electrolyze the lithium-rich alloy) lithium metal is liberated/stripped from the feedstock material, can migrate upwardly through the electrolyte in the intermediate, electrolyte layer 804 and can then collects in the upper, refined metal layer 806 (proximate the cathode conducting member 824) where it can be extracted from the cell 800 using any suitable refined metal extraction system.

In the illustrated example, the refined metal extraction system includes a refined metal extraction conduit 828 having an inlet end 830 that is located inside the housing 812 and in fluid communication with the refined metal-containing, upper, product layer 806 In the illustrated example the refined lithium metal may by at least partially driven thorough the refined metal extraction conduit 828 via the hydrostatic pressure within the housing 812. Optionally, the refined metal extraction conduit 828 can also be connected to any suitable vacuum or flow control apparatus to help motivate the flow of the refined metal, and a suitable refined metal collection or storage vessel.

Preferably, the exposure of the refined lithium metal to oxygen or other potential contaminants while it is in the product layer 806 can be inhibited or minimized, which may help prevent the unwanted reactions. Optionally, the cell 800 can include a gas headspace 807 that is defined as the space within the interior chamber that is above the product layer 806 and is in communication with the exposed, free surface of the product layer 806. The gas headspace 807 preferably contains a cover gas that is preferably substantially free from oxygen, carbon dioxide, nitrogen and water vapour to inhibit oxidation, carbonation, hydration and nitration of the lithium metal in the product layer. The cover gas could be any suitable gas or mixture of gases including argon, helium, a fluorocarbon gas and a hydrocarbon gas that comprises at least one of propane, butane, hexane, and mixtures thereof and other relatively inert gases that will not react with the refined lithium under the conditions that are expected within the cell 800.

Optionally, the cover gas can be circulated and/or flowing through or within the gas headspace 807 while the cell 800 is in use. The cover gas may be fed through the cell 800 at any suitable gas flow rate, which may be, in some examples between 10-20 scfm.

Optionally, as described in this example, the cell 800 can be configured as a flow-through cell, in which at least one of the feedstock and the electrolyte, and preferably both the feedstock and the electrolyte materials are provided in a liquid/molten form such that they can and do flow through the cell 800 (within their respective layers 802 and 804) while it is in use (as compared to a static or batch type of process where both the feedstock and the electrolyte are not flowing while the apparatus is in use). This may allow the cell 800 to be used in an online or real-time basis and in combination with an online or ongoing lithium production process that produces a generally continuous stream/flow of the unrefined lithium metal and lithium-rich alloy. Preferably, the cell 800 is operated so that the liquids flow through the cell 800 with relatively slow velocities/mass flow rates and under generally laminar flow conditions, which may help reduce turbulence or mixing between the layers 802, 804 and 806 while the cell is in use. The flow rates of the feedstock alloy and the electrolyte material (such as a molten salt) can be different from each other, or may be the same.

Preferably, to help maintain the desired 3-layer arrangement, the wherein the lithium-rich alloy is created so that it has a density that is greater than the density of the electrolyte material in layer 804, and preferably can be greater than 1.6 g/cm$^3$, and optionally may be equal to or greater than 2.15 g/cm$^3$. Similarly, it can be preferred that the electrolyte material has a density that is less than the density of lithium-alloy feedstock material (so that it will generally float on anode layer 802) and is greater than the density of the refined lithium metal, e.g. greater than about 0.6 g/cm³, so that the product layer 806 will float on the electrolyte layer 804.

To help accommodate the desired material flows in this schematic illustration, the cell 800 includes a feedstock inlet 808 at one end of the housing 812 and a feedstock outlet 810 that is spaced apart from the feedstock inlet 808 in a first, feedstock flow direction (shown by arrow 814). In the illustrated schematic the feedstock outlet 810 is at the opposing end of the housing 812, but could be in other suitable locations in other examples of an electrorefining cell. Preferably, the feedstock inlet 808 and outlet 810 are located in a lower portion of the housing 812 and are positioned to be in communication with the anode layer 802 while the cell 800 is in use. The specific height and position of the feedstock inlet 808 and outlet 810 may vary in different cell configurations.

The feedstock inlet 808 and outlet 810 can include any suitable flow control mechanisms, such as valves, orifices, nozzles and the like to help control and direct the flow of the feedstock material as desired. The feedstock inlet 808 is preferably fluidly connected to a suitable source of the feedstock material that is to be refined, such as feedstock reservoir, and the feedstock outlet 810 is preferably connected to a suitable sink/storage location for receiving the reacted (and relatively lithium-poor because the lithium has migrated to the product layer 806) lithium-depleted alloy material that exits the cell 800 when in use. One or both of the feedstock source and the feedstock sink may include a suitable tank or vessel that is connected to the cell 800 using any suitable pipes, conduits and the like. Optionally, the feedstock source and the feedstock sink may be combined together in a common reservoir vessel, such that the reacted, lithium-depleted alloy material exiting the cell 800 returns to the reservoir vessel and mixes with new, unreacted relatively lithium-rich feedstock liquid and/or additional crude lithium metal feed material can be added into the reservoir vessel to increase the lithium content of the lithium-alloy feedstock within the reservoir vessel. Then, some of that lithium-rich alloy can be withdrawn from the reservoir vessel and fed back into the cell via inlet 808. Preferably, the cell 800 can be connected to a suitable feedstock alloy reservoir or source/sink vessel via a feedstock circulation system that can also include any suitable conduits, pumps, flow control mechanisms, system controllers and the like.

The molten, lithium-rich alloy that is supplied to the cell 800 and that forms the anode layer 802 can be of any suitable alloy composition that includes the target metal that is to be refined (e.g. lithium in these examples) along with one or more suitable carrier metal. In this example, the cell 800 is configured to refine lithium metal and incoming feedstock liquid is a molten, lithium-rich, metallic alloy liquid that contains crude lithium metal at a first purity alloyed with a carrier material that includes one or more suitable base or carrier metal. Some examples of suitable carrier metals that can be used in the feedstock alloy include lead, bismuth, tin, zinc, indium, thallium, gallium, copper, iron, etc. and their alloys. The purity of the crude lithium metal that is added to the feedstock material can preferably be about 80-99.9 at %, but may be lower than 80 at % in some examples. In addition to the relative purity of the incoming crude lithium metal, the lithium-alloy feedstock is also preferably prepared so that the concentration of lithium metal within the feedstock alloy may be between about 0.1 at % and about 80 at %, and preferably is less than about 80 at % because higher lithium content may alter some of the properties of the resulting lithium-rich alloy in undesirable ways. This is understood to be the concentration of lithium metal in the overall lithium-rich alloy, and does not include the contaminants or other non-lithium components of the incoming crude lithium metal material.

The applicant has tested various different compositions of the lithium-rich alloy and has determined that a lithium-rich alloy that includes a combination of lithium and at least at least two of bismuth, indium and tin can give some relatively desirable properties, and preferably the lithium-rich alloy can be created to include a combination of lithium, bismuth, indium and tin. Optionally, in this arrangement the concentration of bismuth within the carrier material can be between 0 wt %-80 wt %, and optionally may be between 30 wt %-60 wt %, the concentration of indium metal within the carrier material can be between 0 wt %-80 wt %, and optionally may be between 22 wt %-60 wt %, and the concentration of tin within the carrier material can be between 0 wt %-80 wt %, and optionally may be between 10 wt %-60 wt %. These compositions have been tested and found to provide a lithium-rich alloy having a relatively low melting point. Preferably, the lithium-rich alloy is created so that it has a melting temperature that is less than 600 degrees Celsius, and optionally can be less than 580, 560, 550, 525, 500, 480, 460, 450, 420 degrees Celsius. In some configurations, the melting temperature of the lithium-rich alloy is between 100-1000 degrees Celsius, or between 200-800 or 400-600 degrees Celsius, and may be between about 420-550 degrees Celsius. In some examples, the melting temperature can be less than 600 degrees Celsius. In these examples, the operating temperature of the cell 800 can be reduced to a level that is equal to, or preferably at least slightly greater than these melting temperatures, which may help reduce the energy consumption of the cell 800.

To help accommodate the desired electrolyte flows, the cell 800 includes an electrolyte inlet 832 at one end of the housing 812 and a feedstock outlet 834 that is spaced apart from the feedstock inlet 832 in a feedstock flow direction (shown by arrow 836). In the illustrated schematic the electrolyte inlet 832 is at the same end of the housing 812 as the feedstock inlet 808, and the electrolyte outlet 834 is located at the same end of the housing 812 as the feedstock outlet 810, such that the cell 800 is configured in a co-flow arrangement. In other examples, the inlets and outlets may be in different locations, and the cell 800 may be arranged in a counter-flow arrangement (e.g. where flows 814 and 836 are in opposite directions). In yet further embodiments, at least one of the layers 802 and 804 (and optionally both of the layers 802 and 804) need not be flowing and may be relatively static while the cell is in use, such that the cell 800 is operated in a batch manner instead of a flow-through manner.

Preferably, the electrolyte inlet 832 and outlet 834 are located at a higher elevation than the feedstock inlet 808 and outlet and are positioned to be in communication with the electrolyte layer 804 while the cell 800 is in use. The specific height and position of the electrolyte inlet 832 and outlet 834 may vary in different cell configurations.

The electrolyte inlet 832 and outlet 834 can include any suitable flow control mechanisms, such as valves, orifices, nozzles and the like to help control and direct the flow of the feedstock material as desired. The electrolyte inlet 832 is preferably fluidly connected to a suitable source of the electrolyte, and the electrolyte outlet 834 is preferably connected to a suitable sink/storage location for receiving the electrolyte material that exits the cell 800 when in use. One or both of the electrolyte source and the electrolyte sink may include a suitable tank or vessel that is connected to the cell 800 using any suitable pipes, conduits and the like. Optionally, the electrolyte source and the electrolyte sink may be combined together in a common vessel, such that the electrolyte exiting the cell 800 returns to the vessel in a generally closed loop arrangement, while also being configured to allow for the addition of new electrolyte material into the system as needed. Preferably, the cell 800 can be connected to a suitable electrolyte source/sink vessel via an electrolyte circulation system that can also include any suitable conduits, pumps, flow control mechanisms, system controllers and the like.

The electrolyte material that is used to provide the electrolyte layer 804 can be any suitable material, and in the examples described herein is a molten salt that is flowable through the cell 800, if desired, and can include chloride, fluoride, iodide, bromide, sulphate, nitrate and carbonate salts, and mixtures thereof and similar salts of other metals to produce a relatively low-melting point lithium ion containing melt, such as for example LiCl—KCl, LiI—CsI or LiI—KI. Optionally, the electrolyte material may include at least one of, or a mixture of LiCl—KCl, LlI—KI and LiI—CsI. In some examples, electrolyte material may be a eutectic mixture of LiCl—KCl, LlI—KI and LiI—CsI, in which the concentrations are between 46% LiCl-54% KCl (by weight), 58.5% LlI-41.5% KI (by weight) and 45.7% LiI-54.3% CsI (by weight).

When the cell 800 is in use, the relatively lithium-rich, lithium-rich alloy is introduced into the cell 800 via the feedstock inlet 808 to provide the anode layer 802, and the molten salt electrolyte is introduced via the electrolyte inlet 832 to provide the electrolyte layer 804. An electric potential is applied across the anode layer 802 and cathode (e.g. the cathode conducting member 824 and the charged lithium metal in the product layer 806) whereby lithium metal is liberated from the feedstock material, migrates thorough the electrolyte layer 804 and collects toward the top of the housing 812 to provide the refined metal, product layer 806. The product layer 806 is seeded with a portion of relatively pure lithium metal at the start of the process. The feedstock material can exit via feedstock outlet 810 as a relatively lithium-depleted/lithium-lean alloy material, the electrolyte can be withdrawn via electrolyte outlet 834 and at least some of the refined lithium metal can be extracted from the refined layer 806. The refined lithium metal in the refined layer 806 can be at a second purity that is greater that the first purity of the lithium metal in the alloyed feedstock material, and preferably greater than 80%, 85%, 90%, 95% 98%, 99%, 99.9%, 99.99% pure and may be about 99.995% or higher purity in some examples.

One advantage of electrorefining using the electrorefining apparatuses and processes described herein may be that the cell 800 can be operated relatively low power consumption than alternatives, such as distillation. In the illustrated examples, the electrorefining cell 800 can be configured to operate at electropotentials of between about 0V and about 3.6V, or between about 0.6 and about 1.0V, which may allow operations with electrorefining power consumption less than 6 kW/kg metal produced. The cell 800 can be operated at any suitable current density, such as a current density between the anode layer and the cathode is between about 0.001 or 100 A/cm$^2$, or between about 0.05 or 1.5 A/cm$^2$, or between about 0.15-0.75 A/cm$^2$ and optionally can be configured to operate at a current density of at least 0.25 A/cm$^2$.

When operated as described herein, the interior of the electrorefining cell 800 is preferably at a suitable operating temperature that is at least greater than the melting points of the feedstock alloy, refined metal layer and the electrolyte. In some examples the operating temperature can be above 180, 200, 220, 240, 250, 270, 280, 300, 320, 340, 350, 360, 380, 400, 420, 440, 460, 480, 500, 600 degrees Celsius or more and may be less than about 700, 650, 600, 550, 500, 480, 460, 440, 420 degrees Celsius in some preferred examples.

Referring to FIG. 2, the cell 800 is schematically illustrated in combination with other components of an electrorefining apparatus, including a feedstock supply system 840 and an electrolyte supply system 842. In this example, the feedstock supply system 840 includes the feedstock inlet 808 and outlet 810, along with a suitable storage vessel/reservoir 844 and a feedstock circulation circuit 846 that includes a suitable pumping system 848 and other flow control features (not shown). In this arrangement, new, relatively less pure crude lithium metal that is to be refined can be added into the vessel 844 along with the alloying carrier metal material and these components may be mixed and heated within the vessel 844. Heating the materials in the reservoir vessel 844 may reduce the amount of heating that is required inside the interior chamber of the housing 812. Alternatively, the feedstock supply system 840 can include additional vessels for premixing the feedstock material before it is introduced within the vessel 844.

Optionally, the level of the feedstock material within the vessel 844, and/or the relative elevation of the vessel 844 relative to the housing 812 can be varied to change the hydrostatic pressure in the feedstock supply system 840, which may affect the pressure and level of the anode layer 802 within the cell 800. While illustrated as a single vessel 844, a suitable reservoir may include two or more tanks could be used (for example one for supplying the feedstock material and one for receiving material from the cell) with a pump or other suitable systems for balancing the pressures and flows of material therebetween.

This schematic representation of the electrolyte supply system 842 includes the electrolyte inlet 832 and outlet 834, along with an electrolyte source/sink vessel 850 and an electrolyte circulation circuit 852 that includes a suitable pumping system 854 and other flow control features (not shown)

While a single cell 800 is shown for simplicity in FIG. 2, an electrorefining system may include two or more such cells. The multiple cells 800 may also be provided with separate feedstock supply systems 840 and electrolyte supply systems 842, or alternatively two or more cells 800 may be connected to a common feedstock supply system 840 and/or electrolyte supply system 842—preferably in parallel with each other, but optionally in series.

Figure 9:
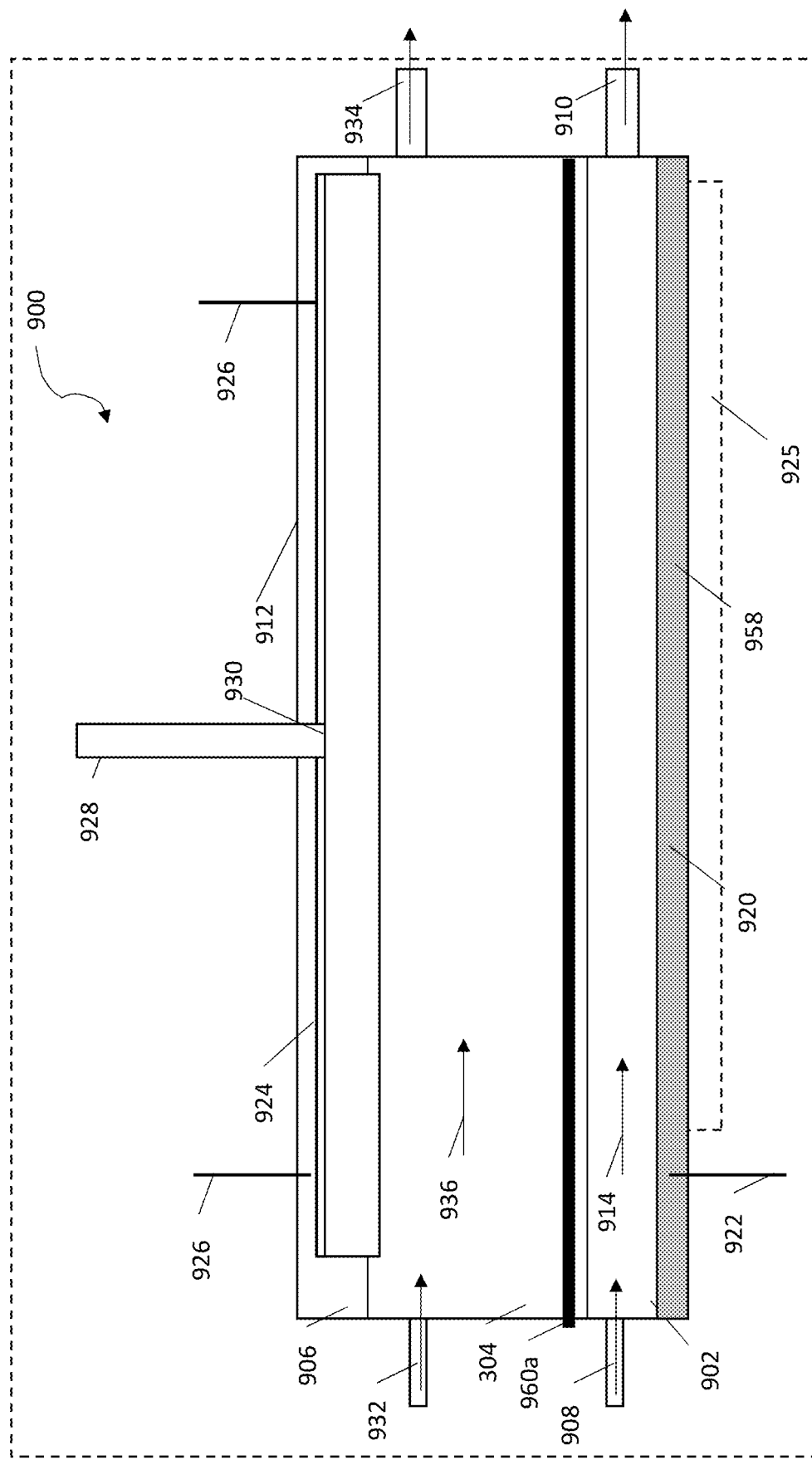
FIG. 9 is a schematic representation of another example of an electrorefining cell.

Referring to FIG. 9, another example of an electrorefining cell 900 is illustrated. The cell 900 is generally analogous to the cell 800 and like features are indicated using like reference characters indexed by 100. In this example, the cell 910 includes an anode layer 902, having a respective feedstock inlet 908 and feedstock outlet 910, a refined metal or product layer 906 and a layer of molten salt electrolyte in the electrolyte layer 904 positioned therebetween, with a respective electrolyte inlet 932 and electrolyte outlet 934. In this example, instead of a separate member that is submerged within the anode layer 902 the anode conductor member 920 in the cell 900 is provided by a conductive portion 958 of the housing 912 that is connected to a power source via the connection 922 and in electrical contact with the metallic anode layer 902, but that is electrically isolated from the cathode conducting member 924. The isolated, anode portion 958 of the housing can be electrically isolated from the cathode conducting member 924 using an electrically insulating/isolating assembly 960 that can include gaskets or other mounting structures, such as an axially extending insulator 960a shown schematically in FIG. 9. This may help simplify construction of the cell 900, and may help facilitate a desired flow of the metallic feedstock alloy in layer 902 as a separate anode conductor member structure need nor protrude into the layer 902 which might impede or disrupt the flow of the molten lithium-alloy feedstock of induce turbulence.

To help maintain the lithium-alloy feedstock and the electrolyte materials at the desired operating temperature, the apparatuses described herein can include any suitable type of heater that can be used to help keep the interior chamber at an operating temperature that is higher than the a freezing temperature of the lithium-rich alloy, the molten salt electrolyte material and the lithium metal.

Optionally, a suitable heater can include a heating element in contact with an outer surface of the housing, such as contact heating element 925 that is schematically illustrated in FIG. 9. Alternatively, or in addition to a housing heater like 925, the system could include one or more inline heaters having heating elements that can heat the flows of the feedstock and electrolyte while they are outside of the interior chamber of the cell—such as the heaters 827 illustrated schematically in FIG. 8. Each of these heating elements, can include resistive heaters, heat exchanger coils and any other suitable heating mechanism.

Alternatively, or in addition to the heaters 827 or 925, the heater used with the apparatus can be an external heating device that does not need to be in direct contact with the cell or the flowing materials. One example of such a device is a furnace chamber or other environment that is sized to contain the entirety of the cell, and optionally the feedstock and/or electrolyte material reservoirs and at least portions of the supply and recycle conduits. The interior of the furnace chamber can be heated to a temperature that is equal to, or preferably is slightly greater than the desired operating temperature of the cell. This ambient, environmental heating can heat the cell and its contents without exposing the heating elements to direct contact with the electrolyte or lithium metal, which may help reduce damage to the heating elements. Examples of such surrounding, furnace chambers are shown schematically as chambers 855 and 955 in FIGS. 2 and 3 respectively. The chambers 8 and 955 are shown in dashed lines to indicate they are optional features of these examples.

Figure 8:
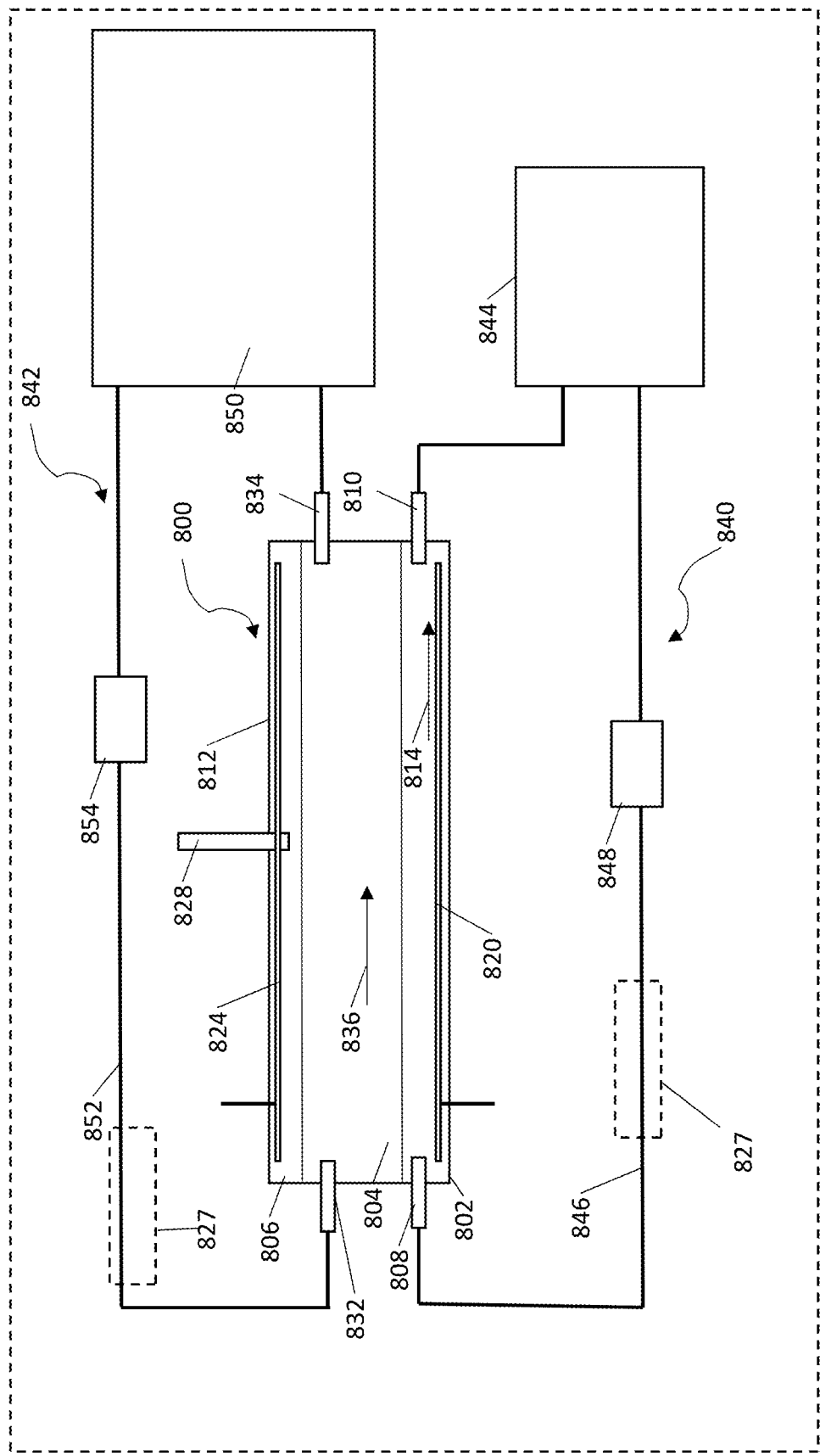
FIG. 8 is a schematic representation of one example an electrorefining apparatus including the electrorefining cell of FIG. 7.

As shown in FIG. 8, the chamber 855 is configured to contain the cell 800, along with the reservoir vessels 844 and 850 and other portions of the material flow circuits, including the electrowinning apparatuses described herein so the whole system can be included in a common furnace. FIG. 9 shows another example, where chamber 955 is configured to contain the cell 900. The other cells described herein may be placed within correspondingly configured furnace chambers to help keep the cells and their contents at or above the desired operating temperatures without requiring direct contact heating elements on the housings or other exterior portions of the cells where they are prone to damage.

Optionally, the same material, possibly drawn from a common electrolyte reservoir, may be used as the anolyte and the catholyte in the electrowinning apparatus, and the electrolyte in the electrorefining process. This may allow circulation of the electrolyte material between the different apparatuses while the process is underway. Alternatively, they may be different materials.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent, or patent application was specifically and individually indicated to be incorporated by reference in its entirety.

I claim:

1. A process for producing refined lithium metal from a lithium feedstock, the process comprising:
   providing a lithium-rich feed alloy, the lithium-rich feed alloy including about 0.1 at. % to about 80 at. % lithium and comprising an admixture of a carrier material and a crude lithium metal having a first purity;
   processing the lithium-rich feed alloy in a flow-through electrorefining apparatus comprising an interior chamber thereby producing and separating a lithium-depleted alloy and a refined lithium metal that has a second purity that is greater than the first purity, the processing comprising:
      providing a molten anode layer comprising the lithium-rich feed allow within the interior chamber;
      providing a flowing electrolyte layer above the anode layer within the interior chamber by conveying a flow of a molten salt electrolyte material into the interior housing via a molten salt electrolyte inlet provided at first end of the interior chamber and withdrawing a flow of the molten salt electrolyte material from the interior chamber via a molten salt electrolyte outlet provided at a second end of the interior chamber; and
      while the anode layer is flowing through the interior chamber, applying an electric potential sufficient to electrolyze the lithium-rich feed alloy between the anode layer and a product layer which is electrically isolated from the anode layer and providing comprises the refined lithium metal above the electrolyte layer within the interior chamber, whereby refined the lithium metal is separated from the lithium-rich feed alloy; and then
   extracting the lithium-depleted allow from the interior chamber and recycling at least a portion of the lithium-depleted alloy into the carrier material.

2. The process of claim 1 further comprising processing a lithium feedstock with an electrowinning apparatus thereby producing a crude lithium metal having a first purity; and
   admixing the crude lithium metal with the carrier material thereby providing the lithium-rich feed alloy.

3. The process of claim 2, wherein producing the crude lithium metal and admixing the crude lithium metal and the carrier material both occur within the electrowinning apparatus.

4. The process of claim 3 wherein the producing the crude lithium metal and admixing with the carrier material occur concurrently.

5. The process of claim 2, wherein the lithium-rich feed alloy is molten when extracted from the electrowinning apparatus and remains molten until it is introduced into the electrorefining apparatus.

6. The process of claim 2, wherein the electrowinning apparatus is a flow-through electrowinning apparatus, and the process further includes:
  conveying a molten, anolyte material and the lithium feedstock along an anolyte flow path within an anolyte chamber containing an anode;
  conveying a molten, catholyte material along a catholyte flow path within a catholyte chamber that has a cathode and is separated from the anolyte chamber via a separator assembly that includes a porous membrane configured to permit metal cation migration between the anolyte chamber and the catholyte chamber;
  applying an electric potential between the anode and the cathode that is sufficient to electrolyze and separate metal ions from the lithium feedstock in the anolyte chamber, thereby causing a flux of metal cations to migrate through the porous membrane from the anolyte chamber to the catholyte chamber and a metal product comprising at least the crude lithium metal to be formed in the catholyte chamber;
  while applying the electric potential, extracting a feedstock-depleted anolyte material from the anolyte chamber via an anolyte outlet; extracting an outlet material comprising the catholyte material and the metal product from the catholyte chamber via a catholyte outlet.

7. The process of claim 6, wherein the carrier material includes include at least two of bismuth, indium, and tin.

8. The process of claim 1, wherein the carrier material includes at least one of bismuth, tin, aluminum, indium, thallium, copper, iron, zinc or an alloy thereof.

9. The process of claim 8, wherein the carrier material includes an admixture of bismuth, indium, and tin.

10. The process of claim 8, wherein the carrier material includes about 30 wt. % to 60 wt. % bismuth, about 22 wt. % to about 60 wt. % indium, and about 10 wt. % to about 60 wt. % tin.

11. The process of claim 1, wherein the lithium-rich feed alloy has a density that is greater than 1.6 g/cm$^3$.

12. The process of claim 1, wherein the lithium feedstock comprises as least one of lithium carbonate and lithium hydroxide.

13. The process of claim 1, wherein the electrorefining apparatus comprises a three-layer electrorefining apparatus having a housing defining the interior chamber; the process further comprising conveying a flow of the lithium-rich feed alloy into the interior chamber via a feedstock inlet and withdrawing a flow of the lithium-depleted alloy from the interior chamber via a feedstock outlet, whereby the molten anode layer is flowing through the interior chamber when the electric potential is applied between the anode layer and the product layer.

14. The process of claim 13, wherein the molten salt electrolyte material includes a fluoride, chloride, bromide, iodide, sulfate, nitrate, and/or carbonate salt of lithium and/or potassium.

15. The process of claim 14, wherein the molten salt electrolyte material comprises at least one eutectic of a LiCl—KCl eutectic, a LiI-KI eutectic, and a LiI—CsI eutectic.

16. The process of claim 15, wherein the molten salt electrolyte material comprises an admixture of eutectics of a LiCl—KCl eutectic, a LiI-KI eutectic, and a LiI—CsI eutectic.

17. The process of claim 1 further comprising removing the refined lithium metal from the product layer while the electrorefining apparatus is in use via a refined metal extraction apparatus in fluid communication with the upper layer.

18. The process of claim 17 further comprising introducing a flow of the lithium-rich feed alloy into the interior chamber via a feedstock inlet in communication with the anode layer; conveying the lithium-rich feed alloy through the interior chamber in a first flow direction; and extracting a flow of the lithium-depleted alloy from the interior chamber via a feedstock outlet.

19. The process of claim 17, further comprising inhibiting mixing between the feedstock layer and the electrolyte layer by conveying the lithium-rich alloy through the interior chamber as a substantially laminar flow.

20. A process for producing refined lithium metal from a lithium feedstock, the process comprising:
  processing a lithium feedstock with an electrowinning apparatus thereby producing a crude lithium metal having a first purity;
  wherein the electrowinning apparatus is a flow-through electrowinning apparatus, and the processing the lithium feedstock includes: applying an electric potential between an anode and a cathode sufficient to electrolyze and separate metal ions from the lithium feedstock in an anolyte chamber, thereby causing a flux of metal cations to migrate through a porous membrane from the anolyte chamber to a catholyte chamber, and causing a metal product comprising at least the crude lithium metal to be formed in the catholyte chamber; extracting a feedstock-depleted anolyte material from the anolyte chamber via an anolyte outlet; and extracting an outlet material comprising a catholyte material and the crude lithium metal from the catholyte chamber via a catholyte outlet;
  admixing the crude lithium metal with a carrier material thereby providing a lithium-rich feed alloy that includes about 0.1 at. % to about 80 at. % lithium;
  continuously processing the lithium-rich feed alloy in an electrorefining apparatus thereby producing and separating a lithium-depleted alloy and a refined lithium metal that has a second purity that is greater than the first purity; wherein the electrorefining apparatus comprises a flow-through, three-layer electrorefining apparatus disposed to receive the lithium-rich feed ally in a molten state and having a housing defining an interior chamber; processing the lithium-rich feed alloy includes:
  providing a flowing anode layer comprising the lithium-rich feed alloy by conveying a flow of the lithium-rich feed allow into the interior chamber via a feedstock inlet at a first end of the housing and withdrawing a flow of the lithium-depleted alloy from the interior chamber via a feedstock outlet at a second end of the housing,
  providing a flowing an electrolyte layer above the anode layer by conveying a flow of a molten salt electrolyte material into the interior chamber via a molten salt electrolyte inlet and withdrawing a flow of the molten salt from the interior chamber via a molten salt electrolyte outlet, and
  providing a product layer comprising the refined lithium metal above the electrolyte layer within the interior chamber; and
  while the anode layer and the electrolyte layer are flowing, applying an electric potential sufficient to electrolyze the lithium-rich feed alloy between the anode layer and the product layer which is electrically isolated from the anode layer, whereby refined lithium metal is separated from the lithium-rich alloy, migrates through the electrolyte layer and collects in the product layer; and then recycling at least a portion of the lithium-depleted alloy into the carrier material.

* * * * *